(12) United States Patent
Wang et al.

(10) Patent No.: US 10,496,544 B2
(45) Date of Patent: Dec. 3, 2019

(54) AGGREGATED WRITE BACK IN A DIRECT MAPPED TWO LEVEL MEMORY

(71) Applicant: INTEL CORPORATION, Santa Clara, CA (US)

(72) Inventors: Zhe Wang, Hillsboro, OR (US); Christopher B. Wilkerson, Portland, OR (US); Zeshan A. Chishti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 15/394,649

(22) Filed: Dec. 29, 2016

(65) Prior Publication Data

US 2018/0189182 A1    Jul. 5, 2018

(51) Int. Cl.
*G06F 12/02* (2006.01)
*G06F 12/0864* (2016.01)
*G06F 12/0891* (2016.01)

(52) U.S. Cl.
CPC ...... *G06F 12/0864* (2013.01); *G06F 12/0891* (2013.01); *G06F 2212/1024* (2013.01)

(58) Field of Classification Search
None
See application file for complete search history.

(56) References Cited

U.S. PATENT DOCUMENTS

| 8,612,676 | B2 | 12/2013 | Dahlen et al. | |
| 2014/0229680 | A1* | 8/2014 | Solihin | G06F 12/0817 711/135 |
| 2015/0149721 | A1* | 5/2015 | Kannan | G06F 12/0811 711/122 |
| 2018/0173637 | A1* | 6/2018 | Shifer | G06F 12/0891 |

OTHER PUBLICATIONS

Lee, H.S., G.S. Tyson, and M.K. Farrens, "Eager Writeback—a Technique for Improving Bandwidth Utilization", [online], 2000, Proceedings of the 33rd annual ACM/IEEE international symposium on Microarchitecture (Micro 33). ACM, New York, NY, USA, 11-21. Retrieved from the Internet at <URL: http://dx.doi.org/10.1145/360128.360132>, Total 11 pp.
(Continued)

*Primary Examiner* — Charles Rones
*Assistant Examiner* — Ryan Dare
(74) *Attorney, Agent, or Firm* — Konrad Raynes Davda & Victor LLP

(57) ABSTRACT

In one embodiment, aggregated write back in a direct mapped two level memory in accordance with the present description, aggregates a dirty block or other subunit of data being evicted from a near memory of a two level memory system, with other spatially co-located dirty subunits of data in a sector or other unit of data for write back to a far memory of the two level memory system. In one embodiment, dirty spatially co-located subunits are scrubbed and aggregated with one or more spatially co-located dirty subunits being evicted. In one embodiment, a write combining buffer is utilized to aggregate spatially co-located dirty subunits prior to being transferred to a far memory write buffer in a write back operation. Other aspects are described herein.

22 Claims, 11 Drawing Sheets

(56) References Cited

OTHER PUBLICATIONS

Stuecheli, J., D. Kaseridis, D. Daly, H.C. Hunter, and L.K. John, "The Virtual Write Queue: Coordinating DRAM and Last-Level Cache Policies", [online], ISCA'10, Jun. 19-23, 2010, Saint-Malo, France. Copyright 2010 ACM 978-1-4503-0053—Jul. 10, 2006, SIGARCH Comput. Archit. News 38, 3 (Jun. 2010), 72-82. Retrieved from the Internet at <URL: http://dx.doi.org/10.1145/1816038.1815972>, Total 11 pp.

Wikipedia, "CPU Cache", [online], [Retrieved on Dec. 5, 2016]. Retrieved from the Internet at <URL: http://www-users.cs.york.ac.uk/pcc/pc_history/CPU_cache.html>, page last modified 07:37, Sep. 20, 2006, Total 12 pp.

\* cited by examiner

AGGREGATED WRITE BACK IN A DIRECT MAPPED TWO LEVEL MEMORY

TECHNICAL FIELD

Certain embodiments of the present description relate generally to management of memory resources.

BACKGROUND

A memory capable of storing a large amount of data frequently has drawbacks such as slower input/output speeds as compared to smaller capacity memories. Conversely, smaller memories which may be faster to operate, may have a greater cost to store data on a per bit basis, as compared to larger capacity memories. Accordingly, computer systems frequently employ a two-level memory system, often referred to as a "heterogeneous" memory system employing a smaller, faster memory as a cache memory for a second, larger and frequently slower memory.

The smaller cache memory is often positioned closer to the central processing unit and thus may have a relatively short data path to the central processing unit to facilitate faster read and write operations between the central processing unit and the cache. Hence, the cache memory is often referred to as the "near" memory. Conversely, the larger, second memory is often positioned more distant from the central processing unit. As a result, the larger, second memory typically has a longer data path to the central processing unit and is frequently referred to as the "far" memory.

Because read and write operations may often be performed more quickly for data stored in the near memory, selected data initially stored in the far memory may be read from the far memory and temporarily cached in the near memory if it is anticipated that the data will be frequently accessed by a processor. However, because the near memory functioning as a cache memory may be more limited in capacity as compared to the far memory, data deemed less likely to be needed for processor operations may be evicted from the near memory in accordance with an eviction policy. If data is modified in the near memory, the modified data is frequently referred to as "dirty" data. If dirty data is to be evicted from the near memory, the dirty data is typically transferred back to the far memory in a write back operation for storage. Unmodified data frequently referred to as "clean" data may be discarded when evicted since a copy of the data already exists in the far memory.

Due to technology differences between read and write operations, write operations transferring write data to the far memory may be transferred in relatively large units of data such as a sector of data which may include multiple subunits of data such as blocks of data to reduce the overhead often associated with such write operations. Conversely, read data being transferred in a read operation from a near memory may be transferred in relatively small subunits of data such as a block of data, for example, to reduce latency of such read operations.

BRIEF DESCRIPTION OF THE DRAWINGS

Embodiments of the present disclosure are illustrated by way of example, and not by way of limitation, in the figures of the accompanying drawings in which like reference numerals refer to similar elements.

DESCRIPTION OF EMBODIMENTS

Figure 1:
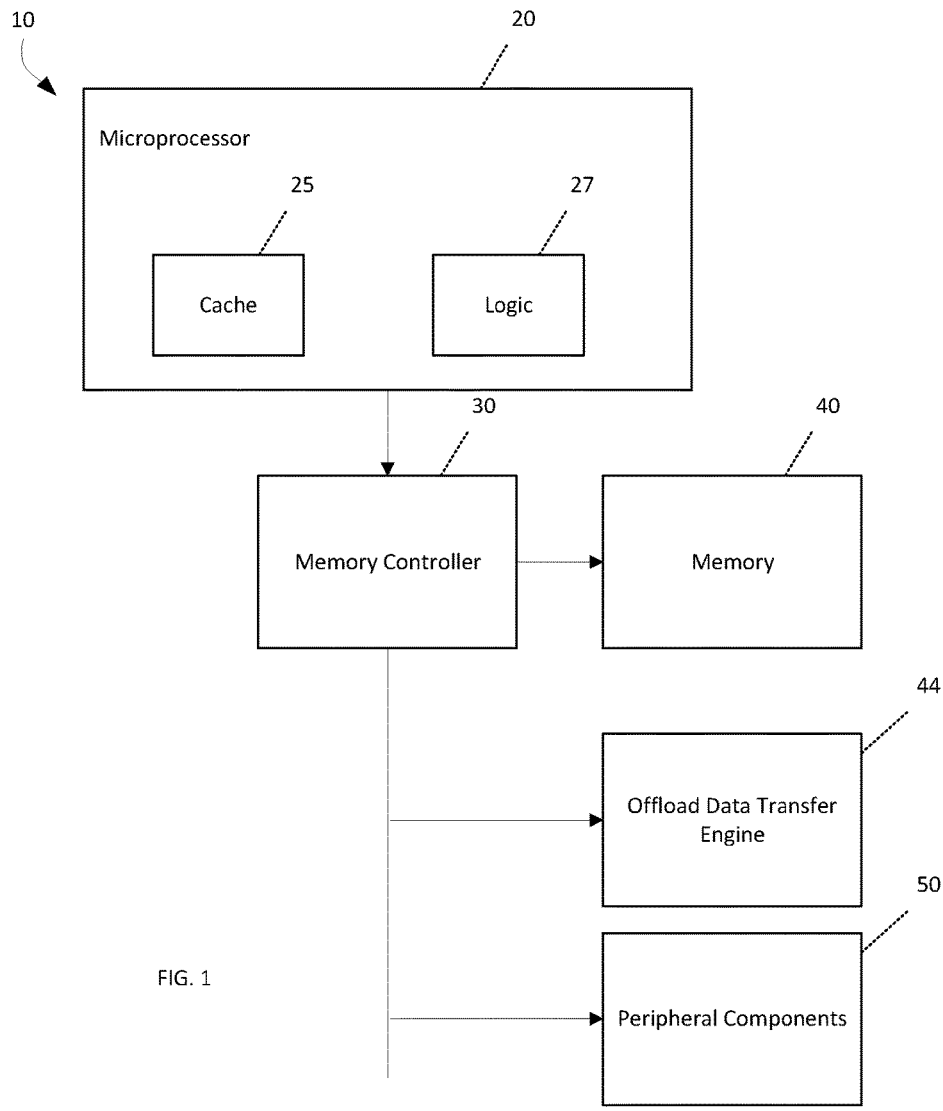
FIG. 1 depicts a high-level block diagram illustrating one embodiment of a system employing aggregated write back in a direct mapped two level memory in accordance with the present description.

In the description that follows, like components have been given the same reference numerals, regardless of whether they are shown in different embodiments. To illustrate one or more embodiments of the present disclosure in a clear and concise manner, the drawings may not necessarily be to scale and certain features may be shown in somewhat schematic form. Features that are described or illustrated with respect to one embodiment may be used in the same way or in a similar way in one or more other embodiments or in combination with or instead of features of other embodiments.

Figure 12:
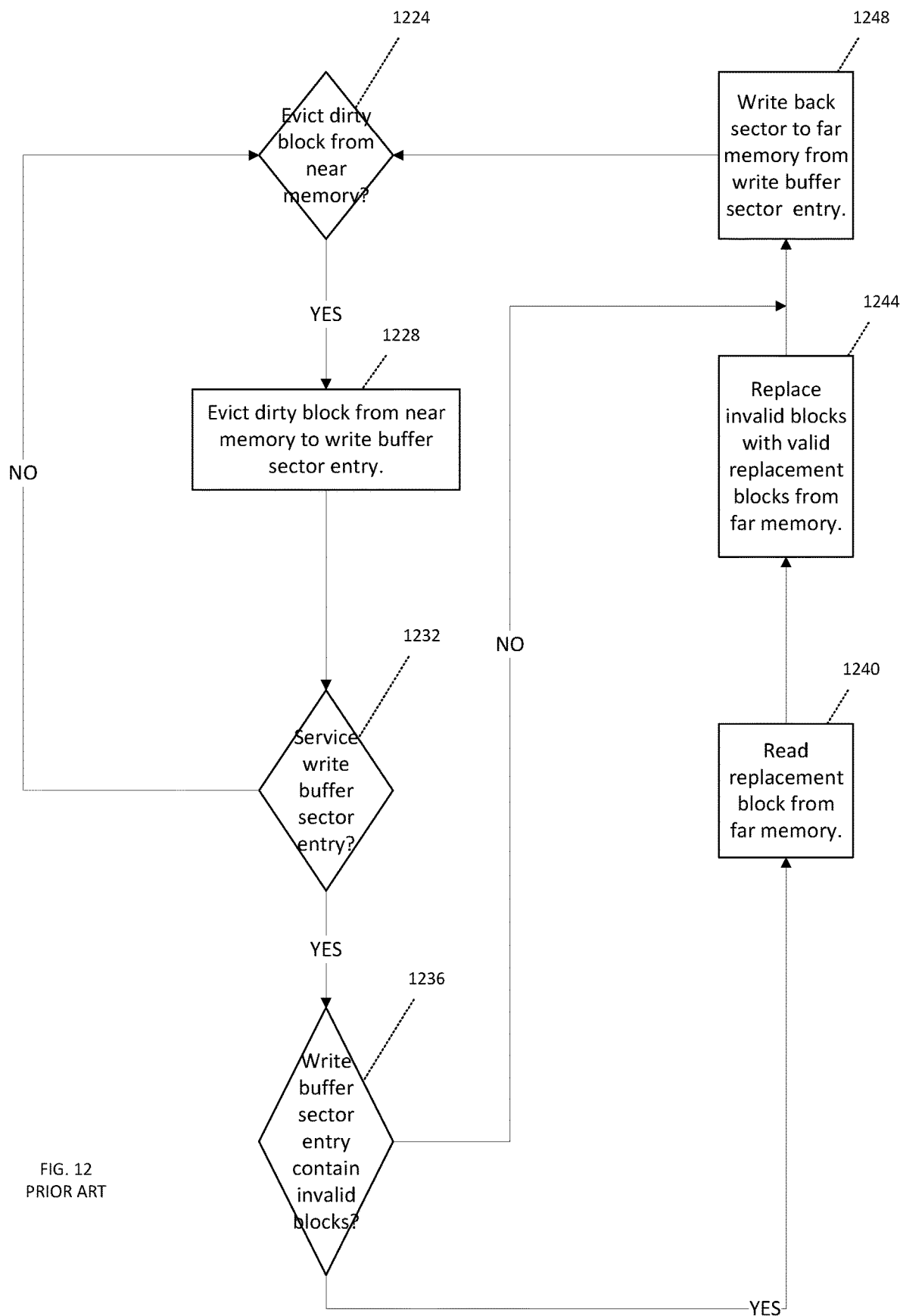
FIG. 12 depict an example of prior write back operations.
Figure 13:
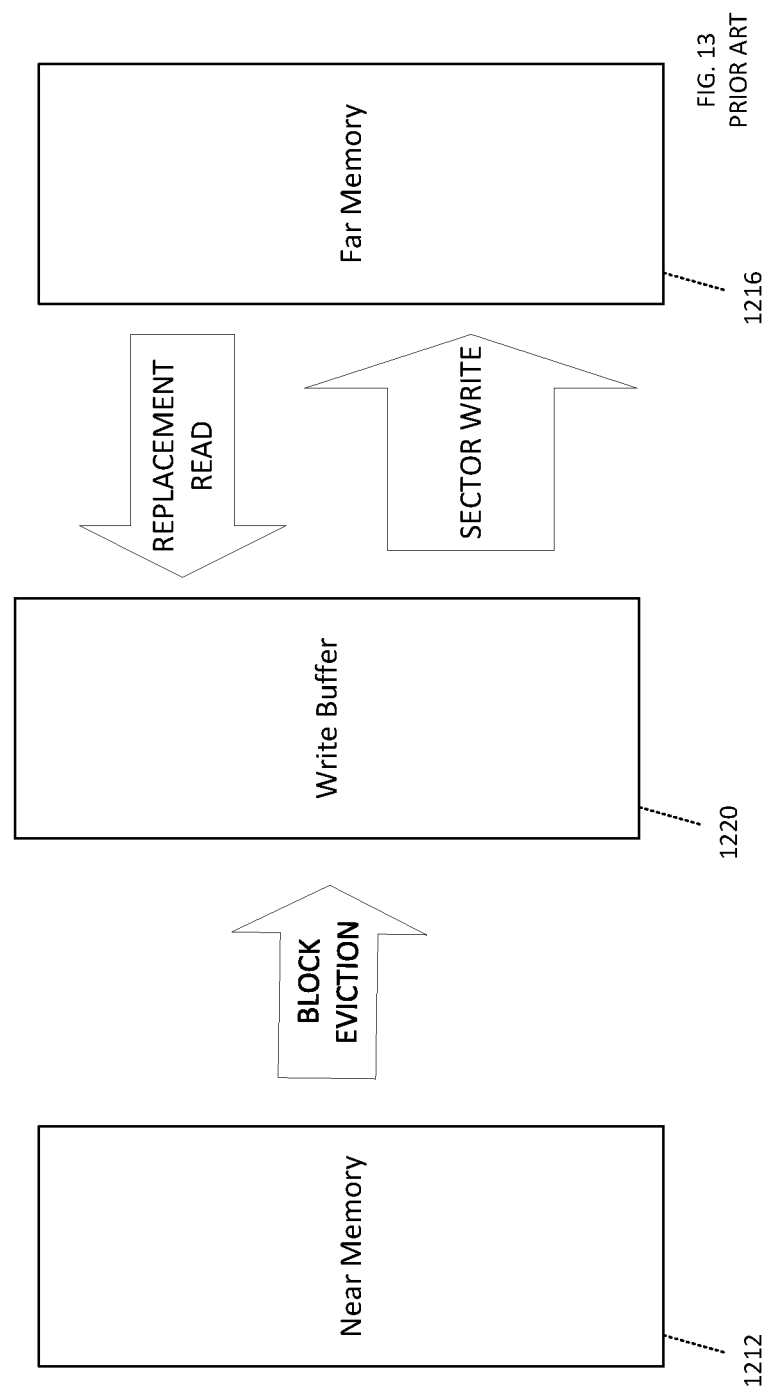
FIG. 13 is a chart depicting an example of prior write back operations of the example of FIG. 12.

It is appreciated that prior write back operations from a cache to storage can significantly delay other memory operations directed to the cache, thereby significantly impact system performance. FIG. 12 depicts an example of a prior write back operation from a near memory 1212 (FIG. 13) to a far memory 1216 via a write buffer 1220. Referring to FIGS. 12 and 13, upon a determination (block 1224) that a block of dirty data which may be of 64 bytes in size, for example, is to be evicted from the near memory 1212, the dirty block is evicted (block 1228) from the near memory 1212 to a sector-sized entry (256 bytes, for example) of the write buffer 1220. An arrow labeled "Block Eviction" in FIG. 13 represents the transfer on an evicted block of dirty data to a write buffer block entry of a write buffer sector entry.

Sectors of data are transferred from the write buffer 1220 to the far memory 1216 in write operations which are scheduled in accordance with a service policy typically implemented by a far memory controller. Accordingly, a determination is made as to whether a particular write buffer sector entry is to be serviced (block 1232). If so, a determination is made (block 1236) as to whether the particular write buffer sector entry contains any invalid blocks of data. For example, a block of data in a write buffer sector entry may be invalid if an evicted block of dirty data has not been transferred (block 1228) to that particular block entry of the write buffer sector entry.

If it is determined (block 1236) that one or more write buffer block entries of a write buffer sector entry to be serviced contain invalid data, valid replacement data is read (block 1240) from the far memory 1216 such that the invalid blocks are replaced (block 1244) with valid replacement blocks of data read (block 1240) from the far memory 1216 as represented by an arrow labeled "replacement read" in the diagram of FIG. 13. The far memory addresses of the valid replacement data may be determined by metadata often referred to as a "tag" which identifies the original far memory address of the far memory sector from which the evicted block of the sector was originally fetched.

Having replaced any invalid blocks of the sector of data with valid replacement blocks from the far memory 1216, a write operation writes back (block 1248) a sector of data from the write buffer sector entry to the far memory at the sector address identified by the associated tag, as represented by an arrow labeled "sector write" in FIG. 13. The sector of data being written back to the far memory includes the dirty block evicted from the near memory 1212 and the valid replacement blocks read from the far memory 1216.

If another dirty block is evicted (block 1224) from the near memory 1212, the prior write back process depicted in FIG. 12 repeats. It is appreciated herein that this prior write back process can incur significant overhead in additional far memory operations to obtain the valid replacement data and write back the data to the far memory. For example, if a write buffer sector to be serviced contains a single dirty block and three invalid blocks, three blocks of valid replacement data will be read from the sector in the far memory to complete the write back operation. However, the next dirty block evicted from the near memory 1212 may be transferred to a write buffer sector entry which is serviced in yet another write back operation notwithstanding that the second evicted dirty block may be written back to the same sector location in the far memory as that of the first evicted dirty block. Moreover, the write buffer sector entry being serviced with a second write back operation may again contain up to three blocks of invalid data which are to be replaced with valid replacement blocks of data from the far memory 1216. As a result, one or more of the same valid replacement blocks of data may be repetitively read from the same sector location in the far memory 1216 for multiple write back operations directed to the same sector location in the far memory 1216.

In one aspect of the present description, aggregated write back logic includes both cache logic and scrubbing logic which enhance the spatial locality of dirty blocks written back to a far memory. For example, the aggregated write back logic coordinates both eviction and scrubbing of dirty data blocks stored in a near memory, to aggregate dirty blocks spatially co-located within a sector, for example, to reduce write back memory operations directed to a far memory. As a result, impact of write back operations upon other memory operations may be reduced and overall system performance may be improved.

In another aspect of the present description, the aggregated write back logic can further include a write combining buffer to aggregate eviction of dirty data blocks spatially co-located within a sector or other data unit stored in a near memory, to aggregate and reduce read memory operations directed to the near memory. As a result, impact of write back operations upon other memory operations may be further reduced and overall system performance may be further improved.

To facilitate aggregation of spatially co-located dirty blocks in a write back operation, aggregated write back logic in accordance with the present description is employed in a direct mapped, two level memory, in which addresses of blocks or other data subunits spatially co-located in the same sector or other data unit in a far memory, are direct mapped to corresponding spatially co-located blocks of a sector in the near memory. Thus, a far memory block address is consistently mapped to a particular near memory block. Further, blocks of a sector cached in the near memory are spatially co-located in the near memory in the same manner as the far memory addresses mapped to those near memory blocks. Accordingly, spatially co-located dirty blocks in the near memory are readily located for an aggregated write back operation to the far memory addresses direct mapped to those near memory locations. In this manner, write back operations can enhance or maximize spatial locality. Although described in connection with sectors and blocks, it is appreciated that aggregated write back in accordance with the present description may be readily applied to other data units and data subunits thereof.

Aggregated write back in a direct mapped two level memory in accordance with the present description may, in one embodiment, be employed in a system of one or more computers configured to perform particular operations or actions of the inter-memory transfer interface, by virtue of having software, firmware, hardware, or a combination of them installed on the system that in operation causes or cause the system to perform the actions. One or more computer programs can be configured to perform particular operations or actions of an inter-memory transfer interface having selective data compression/decompression, by virtue of including instructions that, when executed by data processing apparatus, cause the apparatus to perform the actions.

It is appreciated that aggregated write back in accordance with the present description may be applied to a variety of host, storage and other memory devices such as for example, magnetic, solid state and optical disk drives, and solid state memory devices that use chalcogenide phase change material (e.g., chalcogenide glass), three-dimensional (3D) crosspoint memory, or memory that incorporates memristor technology. Additional memory devices which may benefit from aggregated write in accordance with the present description may include other types of byte-addressable, write-in-place non-volatile memory, ferroelectric transistor random-access memory (FeTRAM), nanowire-based non-volatile memory, Magnetoresistive random-access memory (MRAM), Spin Transfer Torque (STT)-MRAM, Phase Change Memory (PCM), storage class memory (SCM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, SPRAM (spin-transfer torque RAM)), STRAM (spin tunneling RAM), magnetic memory, magnetic random access memory (MRAM), and Semiconductor-oxide-nitride-oxidesemiconductor (SONOS, also known as dielectric memory). It is appreciated that other types of memory may benefit from aggregated write back in a direct mapped two level memory in accordance with the present description, depending upon the particular application.

Turning to the figures, FIG. 1 is a high-level block diagram illustrating selected aspects of a computing system implemented according to an embodiment of the present disclosure. System 10 may represent any of a number of electronic or other computing devices, that may include a memory device. Such electronic devices may include a cloud storage system and other computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, memory, etc.). System 10 can be powered by a battery, renewable power source (e.g., solar panel), wireless charging, or by use of an AC outlet.

In alternative embodiments, system 10 may include more elements, fewer elements, and/or different elements. Moreover, although system 10 may be depicted as comprising separate elements, it will be appreciated that such elements may be integrated on to one platform, such as systems on a chip (SoCs). In the illustrative example, system 10 comprises a central processing unit or microprocessor 20, a memory controller 30, a memory 40, an offload data transfer engine 44, and peripheral components 50 which may include, for example, video controller, input device, output device, storage, network adapter, a power source (including a battery, renewable power source (e.g., photovoltaic panel), wireless charging, or coupling to an AC outlet), etc. The microprocessor 20 includes a cache 25 that may be part of a memory hierarchy to store instructions and data, and the system memory 40 may also be part of the memory hierarchy. The microprocessor 20 further includes logic 27 which may include one or more cores, for example. Communication between the microprocessor 20 and the memory 40 may be facilitated by the memory controller (or chipset) 30, which may also facilitate in communicating with the peripheral components 50.

Peripheral components 50 which are storage devices may be, for example, non-volatile storage, such as solid-state drives (SSD), magnetic disk drives including redundant arrays of independent disks (RAID), optical disk drives, a tape drive, flash memory, etc. The storage may comprise an internal storage device or an attached or network accessible storage. The microprocessor 20 is configured to write data in and read data from the memory 40. Programs in the storage are loaded into the memory and executed by the processor. The offload data transfer engine 44 facilitates memory to memory data transfers which bypass the microprocessor to lessen the load of such transfers on the microprocessor 20. As explained in greater detail below, one embodiment of aggregated write back in a direct mapped two level memory in accordance with the present description, can reduce traffic between a near memory and a far memory to improve system performance.

A network controller or adapter enables communication with a network, such as an Ethernet, a Fiber Channel Arbitrated Loop, etc. Further, the architecture may, in certain embodiments, include a video controller configured to display information represented by data in a memory on a display monitor, where the video controller may be embodied on a video card or integrated on integrated circuit components mounted on a motherboard or other substrate. An input device is used to provide user input to the processor, and may include a keyboard, mouse, pen-stylus, microphone, touch sensitive display screen, input pins, sockets, or any other activation or input mechanism known in the art. An output device is capable of rendering information transmitted from the processor, or other component, such as a display monitor, printer, storage, output pins, sockets, etc. The network adapter may embodied on a network card, such as a Peripheral Component Interconnect (PCI) card, PCI-express, or some other I/O card, or on integrated circuit components mounted on a motherboard or other substrate. The peripheral devices 50 may also include RF receiver/transmitters such as in a mobile telephone embodiment, for example. Additional examples of peripheral devices 50 which may be provided in the system include an audio device and temperature sensor to deliver temperature updates for storage in the memory.

One or more of the components of the device 10 may be omitted, depending upon the particular application. For example, a network router may lack a video controller, for example.

Any one or more of the memory devices 25, 40, and the other devices 10, 30, 50 may include a memory employing aggregated write back in a direct mapped two level memory in accordance with the present description, or be embodied as any type of data storage capable of storing data in a persistent manner (even if power is interrupted to non-volatile memory) such as but not limited to any combination of memory devices that use for example, chalcogenide phase change material (e.g., chalcogenide glass), three-dimensional (3D) crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or another Spin Transfer Torque (STT)-MRAM as described above. Such memory elements in accordance with embodiments described herein can be used either in stand-alone memory circuits or logic arrays, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Figure 2A:
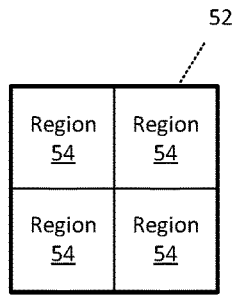
FIGS. 2a-2d depict various hierarchical levels of data storage of the memory of FIG. 1.
Figure 2B:
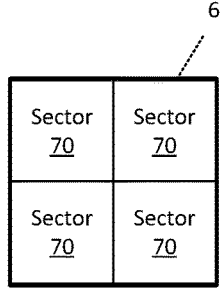

One or more of the memory 40 and storage devices of the peripheral devices 50 may have a rectangular or orthogonal array of rows and columns of cells such as bit cells in which each bit cell is configured to store a bit state. An array of bit cells may be logically subdivided in an array 52 of regions 54 (FIG. 2a). Depending upon the size of the memory, the array of bit cells may have tens, hundreds, thousands, or more of such regions 54. A region 54 may be logically subdivided in an array 60 of sectors 70 (FIG. 2b). Depending upon the size of the memory, the array of sectors may have a single sector or tens, hundreds, thousands, or more of such sectors 70. In one embodiment, the memory 40 or storage device of the devices 50 may include a non-volatile memory such as a flash memory, for example, in which each region 54 represents the smallest subunit of the memory which may be erased at one time.

Figure 2C:
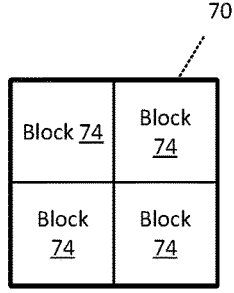
Figure 2D:
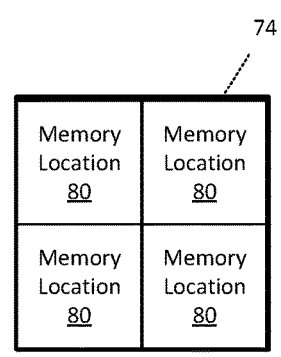

Each sector 70 may in turn be subdivided into an array of blocks 74 (FIG. 2c). Depending upon the size of the memory, a sector 70 of blocks 74 may have a single block, four blocks, or tens, hundreds, thousands, or more of such blocks 74. Each block 74 may in turn be subdivided into an array of memory locations 80 (FIG. 2d). Depending upon the size of the memory, a block 74 of memory locations 80 may have tens (e.g. sixty-four), hundreds, thousands, or more of such memory locations 80. One specific example of a sector is sized sufficiently to store 256 bytes or four blocks of 64 bytes of data. Each memory location includes one or more bit cells to store a bit, a byte, a word or other subunit of data, depending upon the particular application. Although an inter-memory transfer interface in accordance with the present description is described in connection with storing data in a block of one or more sectors, it is appreciated that other units of data storage such as pages, tracks, segments, files, volumes, disks, drives, etc., may be utilized, depending upon the particular application.

A memory interface employing aggregated write back in a direct mapped two level memory in accordance with the present description is described herein in connection with sectors of data, each sector having blocks of data. However, it is appreciated that a memory interface in accordance with the present description may be applied to other units and subunits of data such as volumes, tracks, segments, files, bytes, etc.

A memory interface in accordance with the present description may, in one embodiment, be employed in a system of one or more computers configured to perform particular operations or actions of selective memory mode authorization enforcement, by virtue of having software, firmware, hardware, or a combination of them installed on the system that in operation causes or cause the system to perform the actions. One or more computer programs can be configured to perform particular operations or actions of aggregated write back, by virtue of including instructions that, when executed by data processing apparatus, cause the apparatus to perform the actions.

Other embodiments include corresponding computer systems, apparatus, and computer programs recorded on one or more computer storage devices, each configured to perform the actions of the methods. Implementations of the described techniques may include hardware, a method or process, or computer software on a computer-accessible medium.

Thus, the operations described herein are performed by logic which is configured to perform the operations either automatically or substantially automatically with little or no system operator intervention, except where indicated as being performed manually such as user selection. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 3:
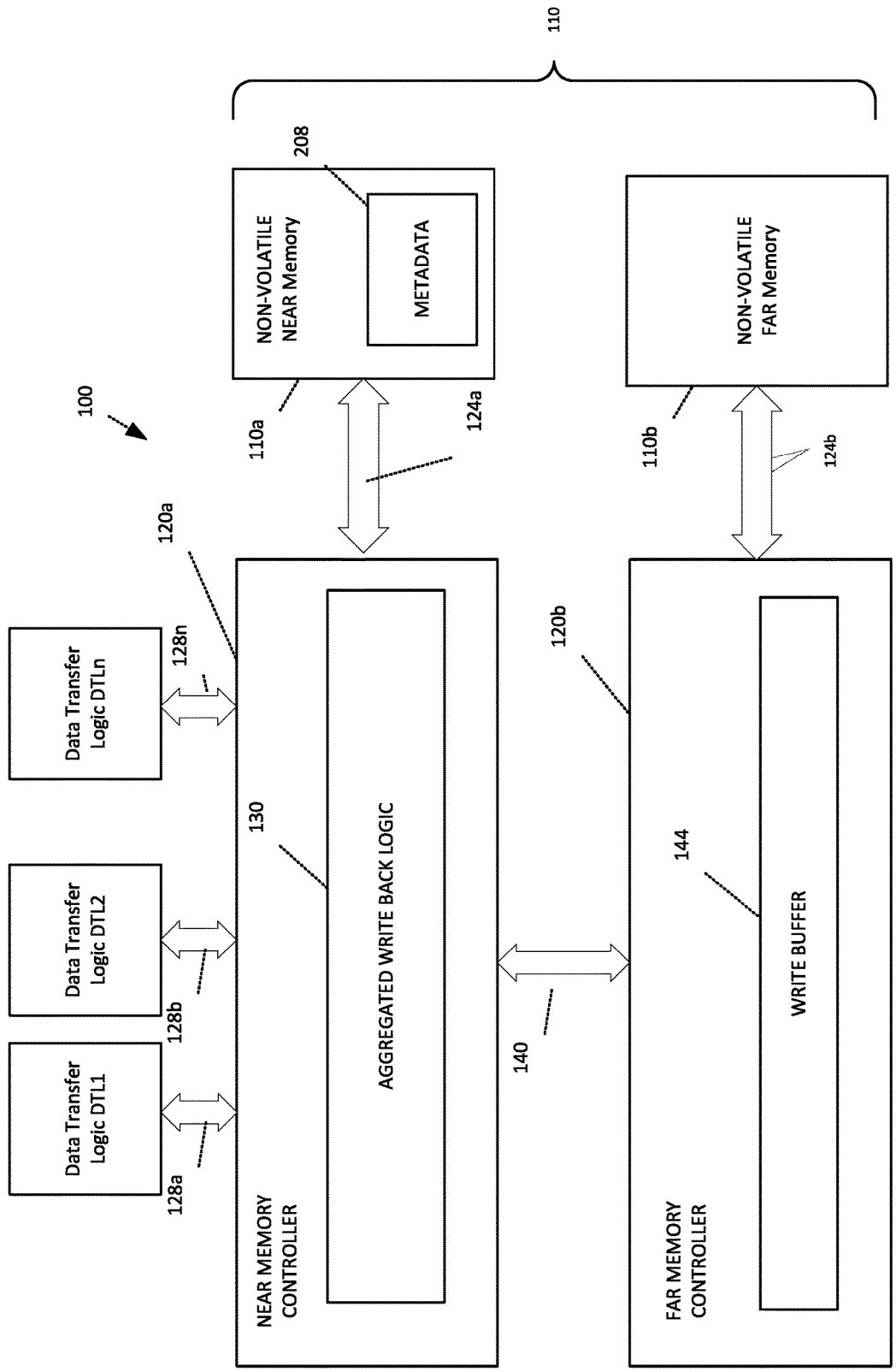
FIG. 3 depicts an embodiment of a memory interface employing aggregated write back for a direct mapped two level memory in accordance with the present description.

FIG. 3 is a high-level block diagram illustrating selected aspects of another embodiment of a computing system implementing aggregated write back in accordance with the present description. In this embodiment, the computing system includes a memory interface 100 between plurality of data transfer logic devices DTL1, DLT2, DTLn, each of which may include a processor, for example, and a two level main memory 110 which includes in this embodiment a volatile near memory 110a and a non-volatile far memory 110b, for example, in which the volatile near memory 110a is a cache for the non-volatile far memory. The far memory 110b is presented as a main memory to the host operating system while the near memory 110a is a cache for the far memory 110b that is transparent to the operation system.

The memory interface 100 includes a near memory controller 120a configured to control memory operations for the near memory 110a via a data path 124a, and a far memory controller 120b configured to control memory operations for the far memory 110b via a data path 124b. Each data transfer logic device DTL1, DLT2, DTLn, is coupled by data paths 128a, 128b, ... 128n to the near memory controller 120a to command data transfer operations. As explained in greater detail below, the near memory controller 120a employs aggregated write back logic 130 to reduce the number of write back operations to the far memory 110b and thereby improve system performance.

In this illustrated embodiment, the near memory controller 120a is configured to control input/output operations for the volatile near memory 110a at a smaller level of granularity than the input/output operations for the non-volatile far memory 110b which are controlled by the far memory controller 120b. For example, data may be written to or read from the far memory 110b by the far memory controller 120b a sector of data at a time. Thus, each read or write operation by the far memory controller 120b can transfer an entire sector of data which is 256 bytes of data in one embodiment. Conversely, in one example, data may be written to or read from the near memory 110a by the near memory controller 120a a block of data at a time which is 64 bytes of data in one embodiment. Thus, each read or write operation by the near memory controller 120a can transfer a block of data which is 64 bytes of data in one embodiment. Accordingly, in one embodiment, the granularity of memory operations of the near memory 110a is at a block level which is a subunit of a sector in which the granularity of memory operations of the far memory 110b may be at the larger, sector level. It is appreciated that aggregated write back in a direct mapped two level memory in accordance with the present description, may utilize other units and subunits of data and other computer architectures, depending upon the particular application.

As explained in greater detail below, the aggregated write back logic 130 aggregates or combines blocks of write back data and transfers those blocks of write back data over a data path 140 to the far memory controller 120b for subsequent storage in the far memory 110b. In one embodiment, the far memory controller 120b includes a write buffer 144 in which each entry of the write buffer 144 is configured to store a sector of write back data from the near memory controller 120a, at a time for subsequent transfer to the far memory 110b.

Figure 4:
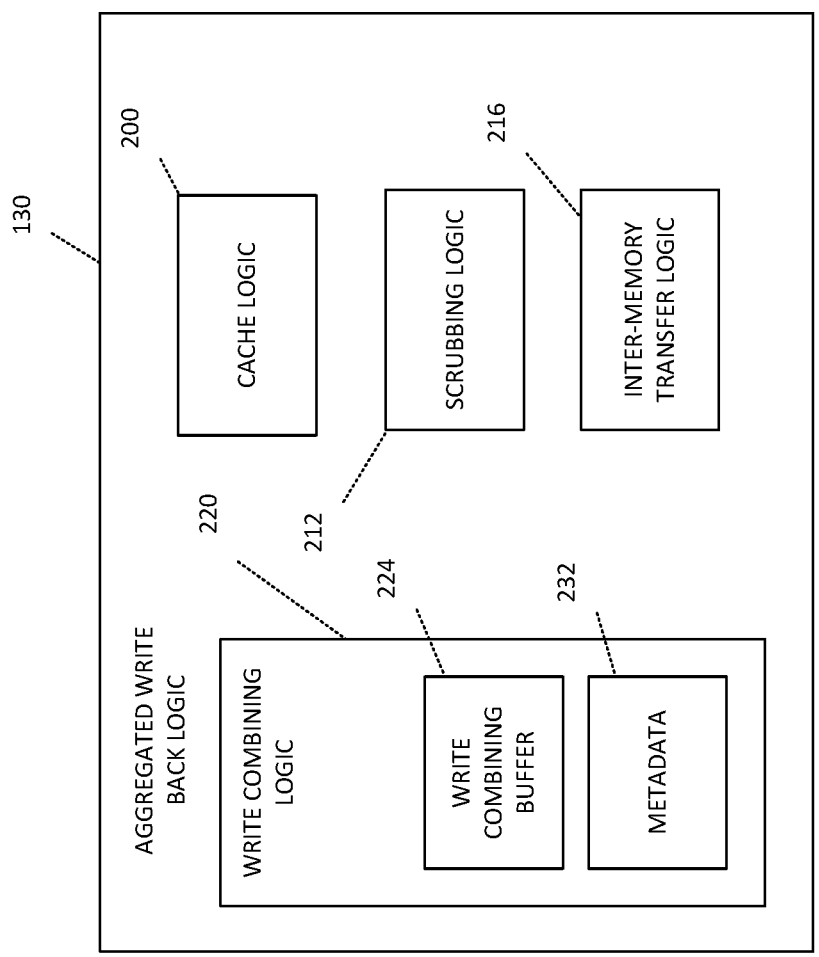
FIG. 4 depicts an embodiment of a memory controller employing aggregated write back for a direct mapped two level memory in accordance with the present description.

FIG. 4 depicts one example of the aggregated write back logic 130 of the near memory controller 120a in greater detail. Referring to FIGS. 3 and 4, in this embodiment, the aggregated write back logic 130 includes cache logic 200 configured to control memory operations for the near memory 110a (FIG. 3) as a direct mapped cache for the far memory 110b. The cache logic 200 fetches data from the far memory 110b and stores it in the higher performance near memory 110a in anticipation of a need for the data by a processor of the data transfer units for a read or write operation. Because the near memory 110a is a higher performance memory in the illustrated embodiment as compared to the far memory 110b, data may in general be read from or written to the near memory 110a at a faster rate than corresponding memory operations directed to the far memory 110b. The cache logic 200 may employ a suitable cache policy to determine which data is to be fetched from the far memory 110b and stored in the near memory 110a in anticipation of a need for the fetched data by a processor of the system.

In the illustrated embodiment, the near memory 110a has a smaller storage capacity than the far memory 110b. Accordingly, as the near memory 110a approaches being filled to capacity, the cache logic 200 is further configured to evict data from the near memory 110a in accordance with an eviction policy. Various types of eviction policies may be employed to identify data which is less likely to be needed by a processor, such as least recently used (LRU) policies which evict the least recently used data to make room for other data which is more likely to be used.

Data stored in a cache is frequently characterized as "clean" data or "dirty" data. Clean data is data that is unmodified as compared to the original data fetched from the far memory. Accordingly, clean data when evicted from the near memory 110a may be simply discarded in some embodiments.

Conversely, dirty data is data that has been modified in the near memory 110a as compared to the original data fetched from the far memory. Accordingly, dirty data when evicted from the near memory 110a is typically not discarded but is instead written back to the far memory in a write back operation in some embodiments.

Figure 5:
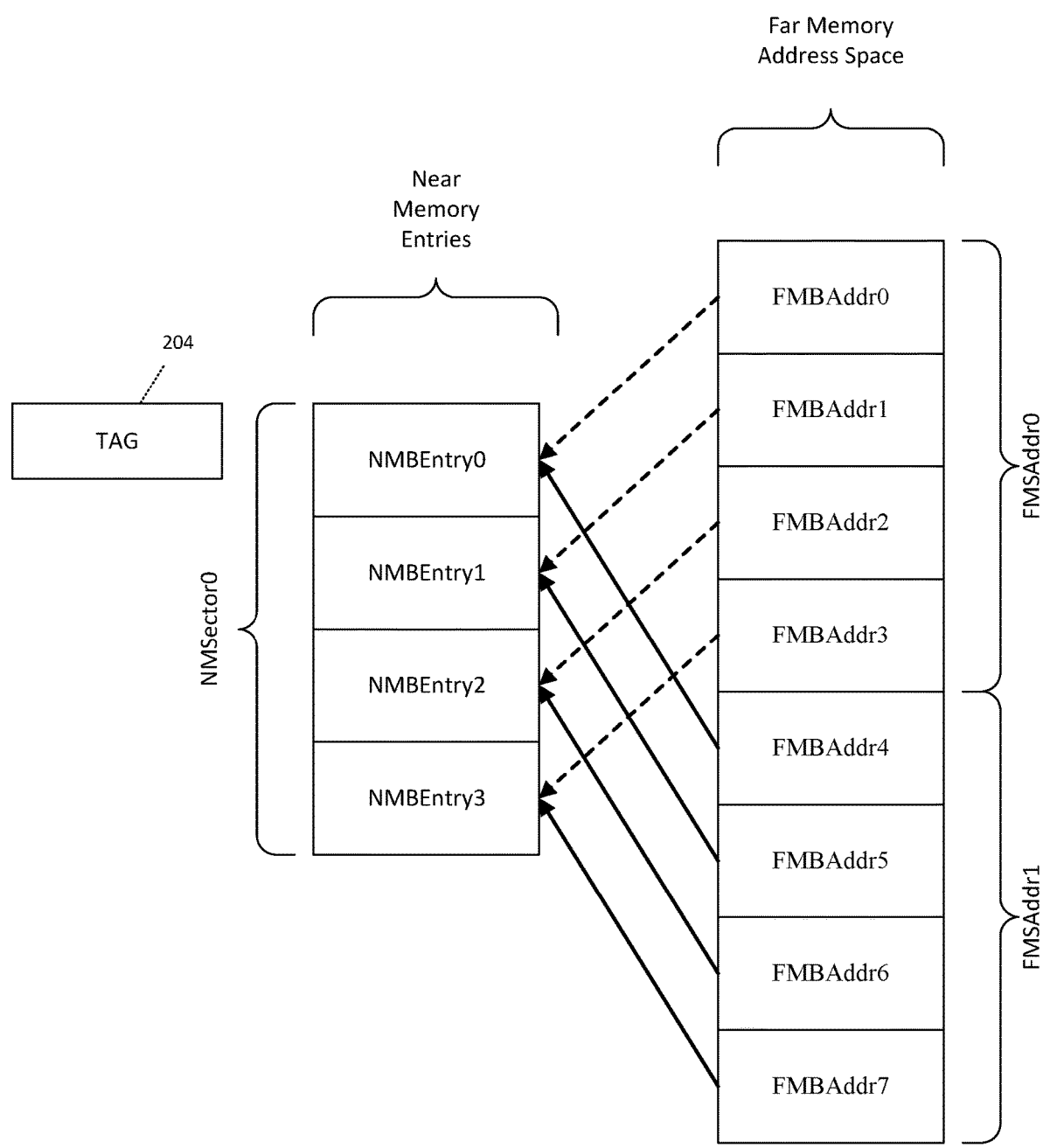
FIG. 5 depicts an embodiment of a direct mapped two level memory employed in aggregated write back in accordance with the present description.

In the illustrated embodiment, sequential, spatially co-located, contiguous addresses of block entries of a sector of the far memory 110b cached in the near memory 110a are direct mapped in a sequential, spatially co-located and contiguous relationship to sequential, spatially co-located and contiguous block entries of a sector of the near memory 110a storing cached entries fetched from the far memory 110b. FIG. 5 shows an example of four far memory block addresses FMBAddr4, FMBAddr5, FMBAddr6, FMBAddr7 for a far memory sector address FMSAddr1 of the far memory address space. The four far memory block addresses FMBAddr4, FMBAddr5, FMBAddr6, FMBAddr7 are spatially co-located within the address space of the same far memory sector address FMSAddr1 in this example. Moreover, the four far memory block addresses FMBAddr4, FMBAddr5, FMBAddr6, FMBAddr7 are assigned sequential address values within the address space of the far memory sector address FMSAddr1 in this example. Still further each far memory block address of the far memory addresses FMBAddr4, FMBAddr5, FMBAddr6, FMBAddr7, is contiguous to the next in sequence far memory address within the address space of the far memory sector address FMSAddr1 in this example. Hence, the four far memory block addresses FMBAddr4, FMBAddr5, FMBAddr6, FMBAddr7 are sequential, spatially co-located and contiguous within a particular sector of the far memory address space.

The four sequential, spatially co-located and contiguous far memory block addresses FMBAddr4, FMBAddr5, FMBAddr6, FMBAddr7 have been direct mapped, as indicated by four associated solid line arrows of FIG. 5, in sequential, spatially co-located and contiguous relationships to four near memory block entries, NMBEntry0, NMBEntry1, NMBEntry2, NMBEntry3, respectively, of a near memory sector NMSector0 of the near memory 110a. The addresses of the near memory block entries, NMBEntry0, NMBEntry1, NMBEntry2, NMBEntry3 are likewise sequential, spatially co-located and contiguous within the same sector (NMSector0) of the near memory address space.

As used herein, the term "direct mapped" refers to a far memory address of the far memory 110b which is mapped consistently and exclusively to a single near memory entry of the near memory 110a. Thus, the far memory block address FMBAddr4 when cached in the near memory 110a, is always mapped to the near memory block entry NMBEntry0, in this example, so that when the data fetched from the far memory block address FMBAddr4 is cached in the near memory 110a, the data fetched from the far memory address FMBAddr4 is cached consistently and exclusively in the near memory block address NBMEntry0. Similarly, the three remaining sequential, spatially co-located and contiguous far memory block addresses FMBAddr5, FMBAddr6, FMBAddr7 are mapped consistently and exclusively to the three sequential, spatially co-located and contiguous near memory block entries, NMBEntry1, NMBEntry2, and NMBEntry3, respectively, of the same near memory sector NMSector0 of the near memory 110a.

Also, in the example of FIG. 5, the sequential, spatially co-located and contiguous far memory block addresses FMBAddr0, FMBAddr1, FMBAddr2, FMBAddr3 when cached in the near memory 110a, are direct mapped as indicated by four associated dotted line arrows of FIG. 5, consistently and exclusively to the four sequential, spatially co-located and contiguous near memory block entries, NMBEntry0, NMBEntry1, NMBEntry2, NMBEntry3, respectively, of the same near memory sector NMSector0 of the near memory 110a when the far memory sector at far memory sector address FMSAddr0 is cached in the near memory sector entry NMSEntry0. As a result of this direct mapping, data fetched by the cache logic 200 from the far memory block addresses FMBAddr0, FMBAddr1, FMBAddr2, FMBAddr3 are stored consistently and exclusively in the four near memory block entries, NMBEntry0, NMBEntry1, NMBEntry2, NMBEntry3, respectively, of the near memory sector NMSector0 of the near memory 110a.

Each near memory block entry has the capacity to store a block (64 bytes in this embodiment) of data fetched from a corresponding far memory block address of the far memory 110b. Thus, the four far memory block addresses FMBAddr4, FMBAddr5, FMBAddr6, FMBAddr7 are sufficient to address a full sector of data stored in the far memory 110b at far memory sector address FMSAddr1 in this example. Accordingly, the four near memory block entries, NMBEntry0, NMBEntry1, NMBEntry2, NMBEntry3, respectively, of the near memory 110a to which the four far memory block addresses FMBAddr4, FMBAddr5, FMBAddr6, FMBAddr7 have been direct mapped, are sufficient to store a full sector of data in the near memory 110a, which is near memory sector NMSector0 in this example.

The near memory 110a is further configured to store for each sector or other unit of data stored in the near memory, a near memory sector tag representing a corresponding far memory sector address of the far memory 110b which is direct mapped to a corresponding near memory sector entry. For example, FIG. 5 depicts a near memory sector tag 204 which identifies the far memory sector address FMSAddr1 of the far memory block addresses FMBAddr4, FMBAddr5, FMBAddr6, FMBAddr7 which are direct mapped to the four near memory block entries, NMBEntry0, NMBEntry1, NMBEntry2, NMBEntry3, respectively, of the near memory 110a. Because the four far memory block addresses FMBAddr4, FMBAddr5, FMBAddr6, FMBAddr7 have been direct mapped in a sequential, spatially co-located and contiguous relationship to the four near memory block entries, NMBEntry0, NMBEntry1, NMBEntry2, NMBEntry3, respectively, of the near memory 110a, each of the four near memory block entries which contain either modified or unmodified data originally fetched in unmodified form from the four far memory block addresses FMBAddr4, FMBAddr5, FMBAddr6, FMBAddr7, may be readily identified and located by the near memory sector tag 204 which is stored in a metadata memory 208 (FIG. 3) of the near memory 110a.

For example, if the near memory sector tag 204 associated with the four spatially co-located near memory block entries, NMBEntry0, NMBEntry1, NMBEntry2, NMBEntry3, of the near memory 110a identifies the far memory block address FMBAddr4 as having been direct mapped to the near memory block entry NMBEntry0, the remaining spatially co-located near memory entries NMBEntry1, NMBEntry2, NMBEntry3, of the near memory 110a containing modified or unmodified data originally fetched in unmodified form from the three direct mapped far memory block addresses FMBAddr5, FMBAddr6, FMBAddr7, respectively, may be readily identified and located as well by the near memory sector tag 204. For example, the addresses of the remaining near memory entries NMBEntry1, NMBEntry2, NMBEntry3 are sequential, spatially co-located and contiguous within the same sector of the near memory address space direct mapped to the corresponding far memory block addresses FMBAddr5, FMBAddr6, FMBAddr7, respectively, which are also sequential, spatially co-located and contiguous within the same sector of the far memory address space. As explained in greater detail below, a direct mapping between sequential, spatially co-located and contiguous addresses of the far memory 110b and sequential, spatially co-located and contiguous entries of the near memory 110a can facilitate aggregation or combining of blocks of write back data in the transfer of those blocks of write back data to the far memory controller 120b for subsequent storage in the far memory 110b.

Figure 6:
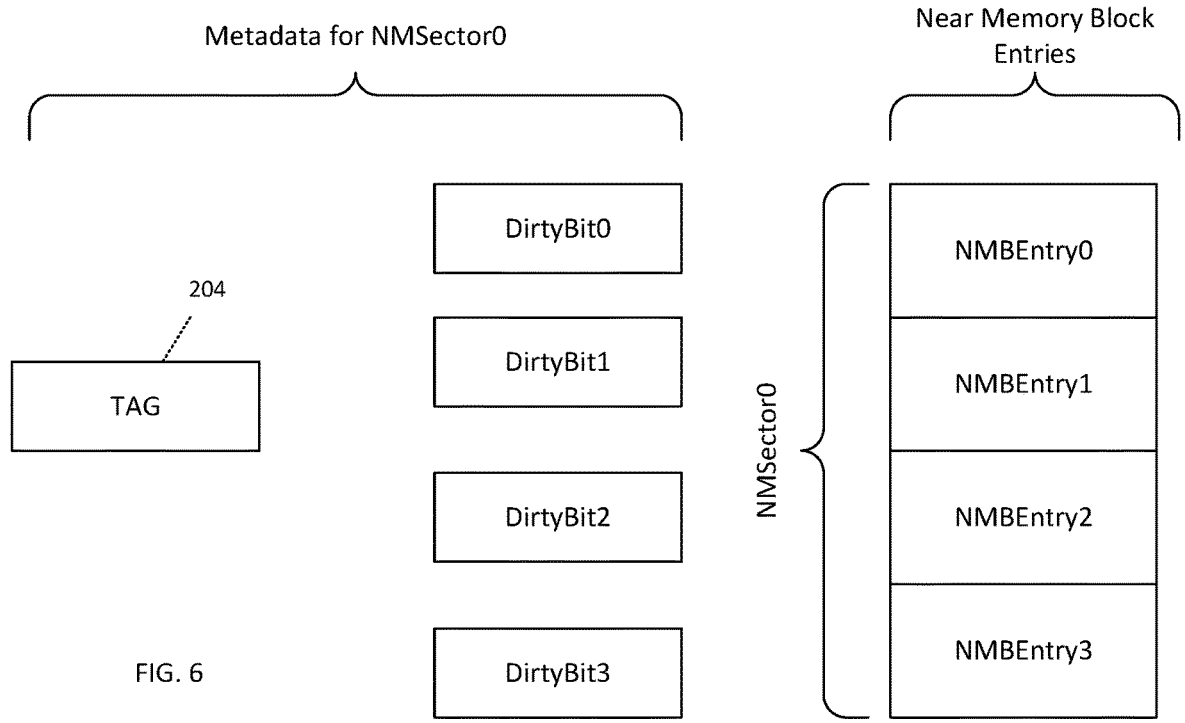
FIG. 6 depicts an embodiment of a metadata employed for a direct mapped two level memory having aggregated write back in accordance with the present description.

The near memory 110a is also configured to store for each block or other subunit of data stored in the near memory 110a, an associated dirty metadata bit which when set indicates that the associated block of data is dirty, that is, the data has been modified as compared to the original data fetched from the far memory 110b and has not yet been transferred back to the far memory in a write back operation. In one example, FIG. 6 depicts four spatially co-located near memory block entries, NMBEntry0, NMBEntry1, NMBEntry2, NMBEntry3, of the near memory sector NMSector0 of the near memory 110a, and four associated metadata dirty bits dirtybit0, dirtybit1, dirtybit2, dirtybit3, respectively. Thus, if the near memory block entry NMBEntry0, for example, is characterized as dirty because it contains modified data, the associated dirty bit dirtybit0 is set. Conversely, if the near memory block entry NMBEntry0 is characterized as clean because it contains unmodified data as compared to that stored in the corresponding far memory block address FMBAddr0 (FIG. 5) direct mapped to the near memory block entry NMBEntry0, the associated dirty bit dirtybit0 is reset.

As described above, the cache logic 200 (FIG. 4) is configured to evict a dirty block or other subunit of a sector or other unit of data stored in the near memory 110a for transfer to the far memory 110b in a write back operation. Thus, near memory block entries such as the near memory block entry NMBEntry0 may be evicted from the near memory 110a in accordance with the cache eviction policy, to make room for data to be fetched from the far memory 110b, if the associated dirty bit dirtybit0 has been set indicating that the near memory block entry NMBEntry0 is dirty.

In one aspect of the present description, working in association with the eviction operations of the cache logic 200, is a scrubbing logic 212 of the aggregated write back logic 130, in which the scrubbing logic 212 is configured to automatically scrub one or more additional spatially co-located dirty blocks of data of the same sector of data from which a spatially co-located dirty block of data was evicted by the cache logic 200. Thus, if the near memory block entry NMBEntry0, for example, is being evicted from the near memory 110a, and another spatially co-located dirty block such as the near memory block entry NMBEntry1, for example, of the same near memory sector NMSector0 in this example, is indicated by its associated dirty bit dirtybit1, to be dirty, spatially co-located near memory block entry NMBEntry1 may be automatically scrubbed by the scrubbing logic 212 in connection the eviction of near memory block entry NMBEntry0.

As used herein, scrubbing a block of data refers to reading a dirty block of data from the near memory for subsequent transfer to the far memory. In one embodiment the read block of data remains in the near memory instead of being evicted. In addition, the scrubbing logic 212 is further configured to reset the associated dirty bit of the scrubbed block of data to indicate that the block of data remaining in the near memory is characterized as clean since the scrubbed data will be stored at the corresponding address in the far memory. In this manner, the scrubbing logic 212 is configured to scrub one or more additional spatially co-located blocks of data from the same sector of data in the near memory so that the additional spatially co-located block of data of the same sector of data is read from the near memory and marked as clean in the near memory instead of being evicted from the near memory in accordance with the eviction policy. As explained in greater detail below, coordinated operations of the cache logic 200 and the scrubbing logic 212 to evict and scrub, respectively, spatially co-located data blocks of a sector stored in the near memory 110a can aggregate and reduce memory operations of the far memory 110b.

An inter-memory transfer logic 216 (FIG. 4) of the aggregated write back logic 130 is configured to write back to the far memory 110b, both the evicted block and any additional scrubbed spatially co-located blocks of data of a particular sector to provide an aggregated sector of data which includes the evicted block and the scrubbed spatially co-located blocks to store in a write operation to the far memory 110b.

As noted above, the scrubbing logic 212 in one embodiment, is configured to automatically scrub an additional spatially co-located dirty block of data of the same sector of data in response to the eviction a spatially co-located block of data from the same sector cached in the near memory in accordance with the eviction policy. It is appreciated that in other embodiments, scrubbing of spatially co-located blocks of data may be triggered by events other than data eviction from the near memory 110a, depending upon the particular application. For example, as described in connection with another embodiment, scrubbing may be triggered by eviction of data from a write combining buffer. As a result, scrubbing operations directed to the near memory may be reduced in some applications, while also reducing memory operations directed to the far memory.

Figure 7:
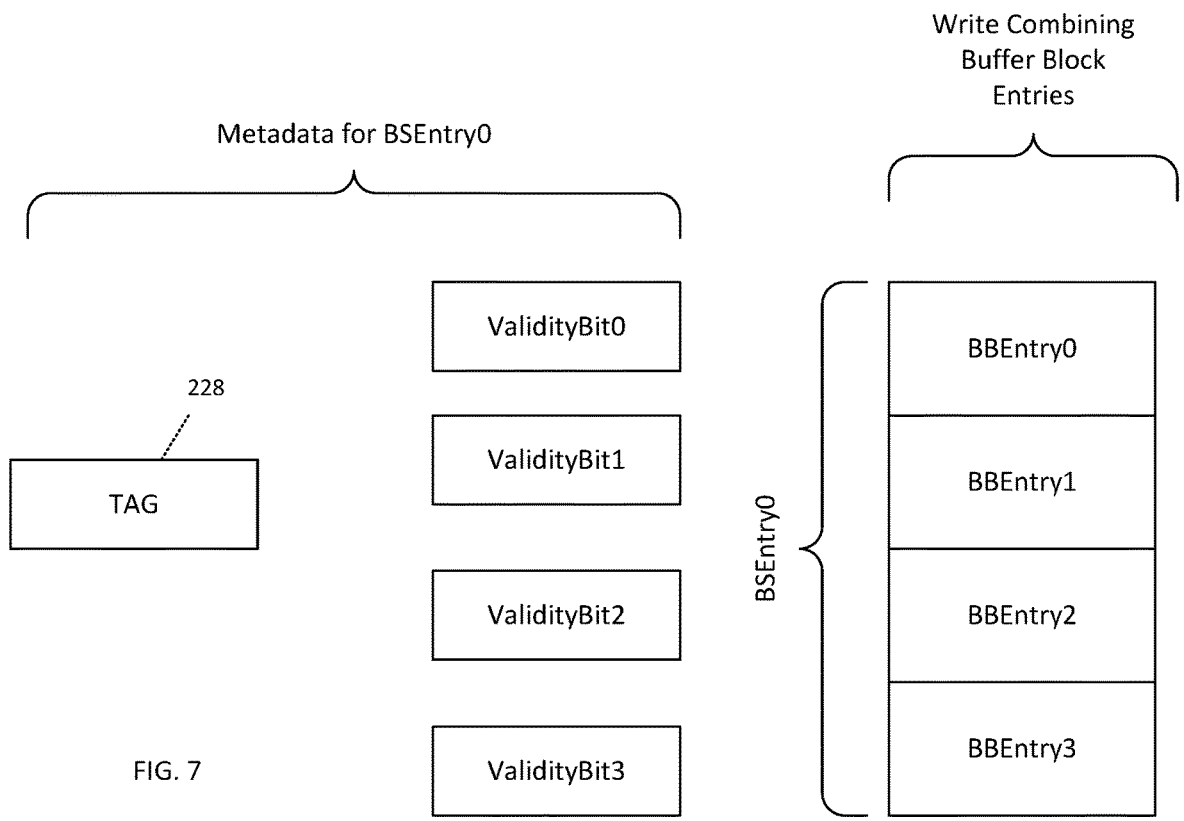
FIG. 7 depicts an embodiment of a metadata employed for a write combining buffer having aggregated write back in accordance with the present description.

Accordingly, in one embodiment, the aggregated write back logic 130 (FIG. 4) may further include write combining logic 220 having a write combining buffer 224 which in turn has a plurality of write combining buffer sector entries, an example of which is write combining buffer sector entry BSEntry0 depicted in FIG. 7. Each write combining buffer sector entry is configured to store up to a sector of data in four buffer block entries, BBEntry0, BBEntry1, BBEntry2, BBEntry3. For example, the write combining logic 220 is configured to store in a buffer block entry such as the block buffer entry BBEntry0 of the write combining buffer sector entry BSEntry0 of the write combining buffer 224, a dirty block of data evicted by the cache logic 200 from a near memory block entry such as the near memory block entry NMBEntry0, for example.

The write combining logic 220 is further configured to store metadata 232 including write combining buffer sector tags for each write combining buffer sector entry of the write combining buffer 224. For example, write combining buffer sector tag 228 is associated with the write combining buffer sector entry BSEntry0 of the write combining buffer 224. The write combining buffer sector tag stores data representing the far memory sector address (as represented by a near memory sector tag) which has been mapped to the near memory sector of the near memory block entry evicted from the near memory and stored in the associated buffer block entry of the buffer sector entry of the write combining buffer 224.

In the example above in which data evicted from the near memory block entry NMBEntry0 is temporarily stored in the buffer block entry BBEntry0 of the write combining buffer sector entry BSEntry0 of the write combining buffer 224, the write combining buffer sector tag 228 is associated with the write combining buffer sector entry BSEntry0 of the write combining buffer 224, and represents the far memory sector address FMSAddr1 (as represented by the near memory sector tag 204) which has been mapped to the near memory sector entry NMSEntry0. Accordingly, in this example, the far memory sector address FMSAddr1 mapped to the near memory sector NMSector0 as indicated by the tag 204, may also be mapped to the write combining buffer sector entry BSEntry0 by the write combining buffer sector tag 228 stored in metadata storage 232 (FIG. 4) of the write combining logic 220.

A write combining buffer sector tag associated with each write combining buffer sector entry such as, for example, the tag 228 associated with the write combining buffer sector entry BSEntry0, facilitates consolidating spatially co-located dirty blocks evicted from the near memory and storing them in a common write combining buffer entry for a particular sector as indicated by the write combining buffer sector tag. The write combining logic 220 is configured to compare the near memory sector tag of an evicted dirty block to one or more write combining buffer sector tags of the write combining buffer sector entries to identify a write combining buffer sector tag matching the near memory sector tag of the evicted block. If a matching write combining buffer sector tag is located, the evicted dirty block is stored in the associated write combining buffer sector entry containing one or more previously stored spatially co-located evicted dirty blocks. In this manner, spatially co-located evicted blocks may be aggregated and stored in a common write combining buffer sector entry having a write combining buffer sector tag matching that of the aggregated, spatially co-located evicted dirty blocks stored in that write combining buffer sector entry.

In the example above, a dirty block of data evicted from the near memory block entry NMBEntry0, is stored in the block buffer entry BBEntry0 of the buffer sector entry BSEntry0 of the write combining buffer 224. In addition, data of the near memory sector tag 204 representing the far memory sector address FMSAddr1 (FIG. 5) mapped to the near memory sector NMSector0 which contained the evicted near memory block entry NMBEntry0, is stored in the metadata 232 (FIG. 4) as the write combing buffer sector tag 228 (FIG. 7).

If another dirty block of data is evicted from the near memory 110a in accordance with the eviction policy, the write combining logic 220 is further configured to compare the data of the near memory sector tag representing the far memory address mapped to the near memory entry which stored the second evicted block of data, to data of the write combining buffer sector tag of each write combining buffer sector entry until a match is located if present. For example, if the second dirty block of data is evicted from the near memory block entry NMBEntry1, the write combining logic 220 determines that the near memory sector tag 204 (FIG. 6) representing the far memory sector address mapped to the near memory sector entry which stored the second evicted block of data, that is near memory block entry NMBEntry1, matches the data of the write combining buffer sector tag 228 (FIG. 7) representing the far memory sector address mapped to the buffer sector entry BSEntry0 of the write combining buffer 224. Accordingly, the second dirty block of data which was evicted from the near memory block entry NMBEntry1 is stored in the write combining buffer sector entry BSEntry0 having the matching tag 228. As a result, the evicted dirty data of the spatially co-located near memory entries NMBEntry0 and NMEntry1 are aggregated and stored in corresponding block entries of the common write combining buffer sector entry BSEntry0 having the matching write combining buffer sector tag 228. In a similar manner, each additional block of dirty data evicted from the near memory is stored with spatially co-located blocks in a common write combining buffer entry having a write combining buffer sector tag matching the near memory sector tag of each of the spatially co-located evicted blocks stored in the particular write combining buffer sector entry.

Conversely, if the near memory sector tag data of a block of dirty data evicted from the near memory, does not match the data of any write combining buffer tag of the existing write combining buffer sector entries, the write combining logic 220 is configured to allocate a new write combining buffer sector entry and store the evicted block of dirty data in a corresponding block entry of the newly allocated write combining buffer sector entry. In addition, the write combining logic 220 is further configured to store the near memory sector tag data representing the far memory sector address mapped to the sector from which the dirty block was evicted, to a write combining buffer sector tag associated with the newly allocated write combining buffer sector entry.

As noted above, far memory addresses of the far memory 110b are direct mapped in a sequential, spatially co-located and contiguous relationships as represented in FIG. 5. As a result of this direct, sequential and contiguous mapping, tag comparison address identification and entry location operations may be substantially simplified since far memory addresses are mapped to exclusive near memory locations. Further addresses of blocks within sectors may be readily identified by their sequential, contiguous spatial relationships with the sector. For example, the near memory block entries NMBEntry0-NMBEntry3 have a common near memory sector tag 204 and the write combining buffer block entries BBEntry0-BBEntry3 share a common write combining buffer sector tag 228. An address of an individual block within a sector may be readily calculated as a function of the tag for the sector containing that block and the sequent, contiguous spatial relationship of the block within the sector. For example, addresses of the near memory block entries NMBEntry0-NMBEntry3 may be calculated by indexing an address represented by the associated tag.

As noted above, in one embodiment, the scrubbing logic 212 is configured to automatically, in connection with eviction of a block of data from the near memory, scrub one or more additional spatially co-located dirty blocks of data of the same sector of data from which a dirty block of data was evicted by the cache logic 200. In an embodiment which includes the write combining buffer 224 (FIG. 4), the scrubbing logic 212 may be configured to automatically, in connection with eviction of a write combining buffer sector entry, scrub one or more additional spatially co-located dirty blocks of data of the same sector of data from which one or more spatially co-located dirty blocks of data were evicted by the cache logic 200, to further aggregate spatially co-located dirty blocks for a write back to the far memory.

In this embodiment, the write combining logic 220 is configured to evict a write combining buffer sector entry in accordance with a suitable eviction policy. For example, since the write combining buffer is of finite size, write combining buffer sector entries may be evicted to make room for additional data being evicted from the near memory 110a. Suitable eviction policies for the write combining logic include first-in, first-out (FIFO), least recently used (LRU) and pseudo least recently used (LRU) eviction policies, for example.

Accordingly, the inter-memory transfer logic 216 may be further configured to write back the data of the sector entry evicted from the write combining buffer 224. The data of the sector entry evicted from the write combining buffer 224 may be up to a sector in size include the aggregated evicted and scrubbed spatially co-located blocks, to be stored in the far memory 110b at the far memory address represented by the write combining buffer sector tag (FIG. 7) associated with the evicted write combining buffer sector entry.

In another aspect of this embodiment, the metadata memory 232 maintained by the write combining logic 220 may be configured to store for each block of data stored in a write combining buffer sector entry, an associated write combining buffer block validity metadata bit which when set indicates that the associated block of data stored in the write combining buffer block entry is valid. FIG. 7 depicts an example of four write combining buffer block entries BBEntry0, BBEntry1, BBEntry2, BBEntry3 and four write combining buffer block validity metadata bits ValidityBit0, ValidityBit1, ValidityBit2, ValidityBit3, associated with the four write combining buffer block entries BBEntry0, BBEntry1, BBEntry2, BBEntry3, respectively. When a block of dirty data is evicted from the near memory and stored in a write combining buffer block entry, the write combining logic 220 is configured to set the write combining buffer block validity metadata bit associated with that write combining buffer block entry to indicate that the contents of the particular write combining buffer block entry is valid.

As noted above, the scrubbing logic 212 may be configured in this embodiment, to automatically, in connection with eviction of a write combining buffer sector entry, scrub one or more additional spatially co-located dirty blocks of data of the same sector of data from which one or more spatially co-located dirty blocks of data were evicted by the cache logic 200. For example, in response to eviction of a write combining buffer sector entry, such as the write combining buffer sector entry BSEntry0, for example, the scrubbing logic 212 in this embodiment, is further configured to detect as a function of the state of a validity metadata bit whether a block of data in a write combining buffer block entry of that sector entry is invalid. If an invalid block of data in a write combining buffer block entry in a write combining buffer sector entry being evicted, is detected, the scrubbing logic 212 is configured to scrub the corresponding block of data of the same sector from the near memory 110a to replace the detected invalid block of data. In this manner, data of a sector provided by the inter-memory transfer logic 216 (FIG. 4) includes aggregated evicted and scrubbed spatially co-located blocks of data for a sector from the near memory to be written back to the far memory 110b. It is believed that scrubbing operations directed to the near memory 110a may be reduced utilizing the write combining buffer to aggregate a plurality of spatially co-located blocks of data evicted from the same sector in the near memory, and by triggering scrubbing operations of spatially co-located blocks when a sector entry of the write combining buffer is evicted to the far memory.

Figure 8:
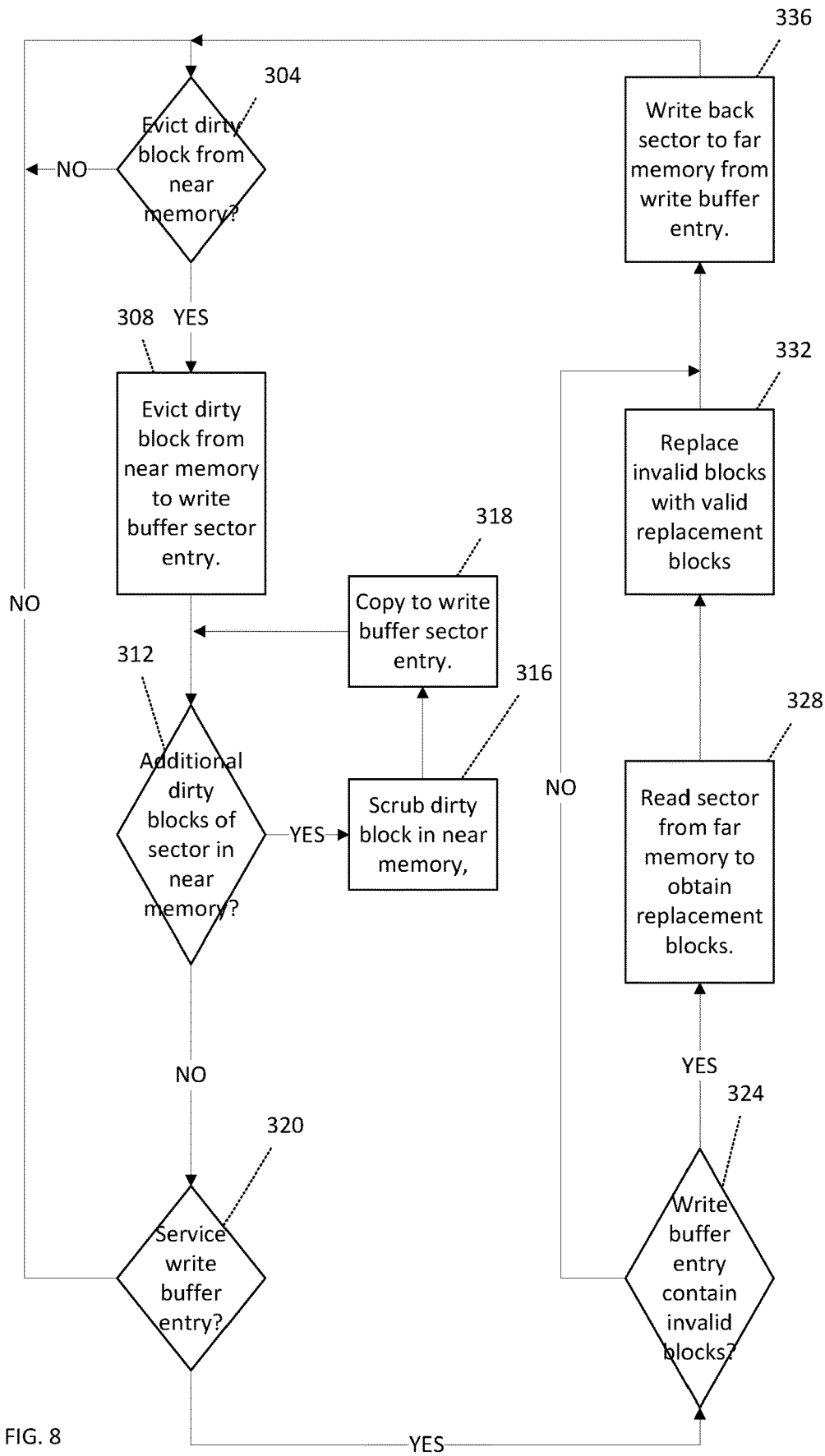
FIG. 8 depicts an embodiment of operations employing aggregated write back in a direct mapped two level memory in accordance with the present description.
Figure 9:
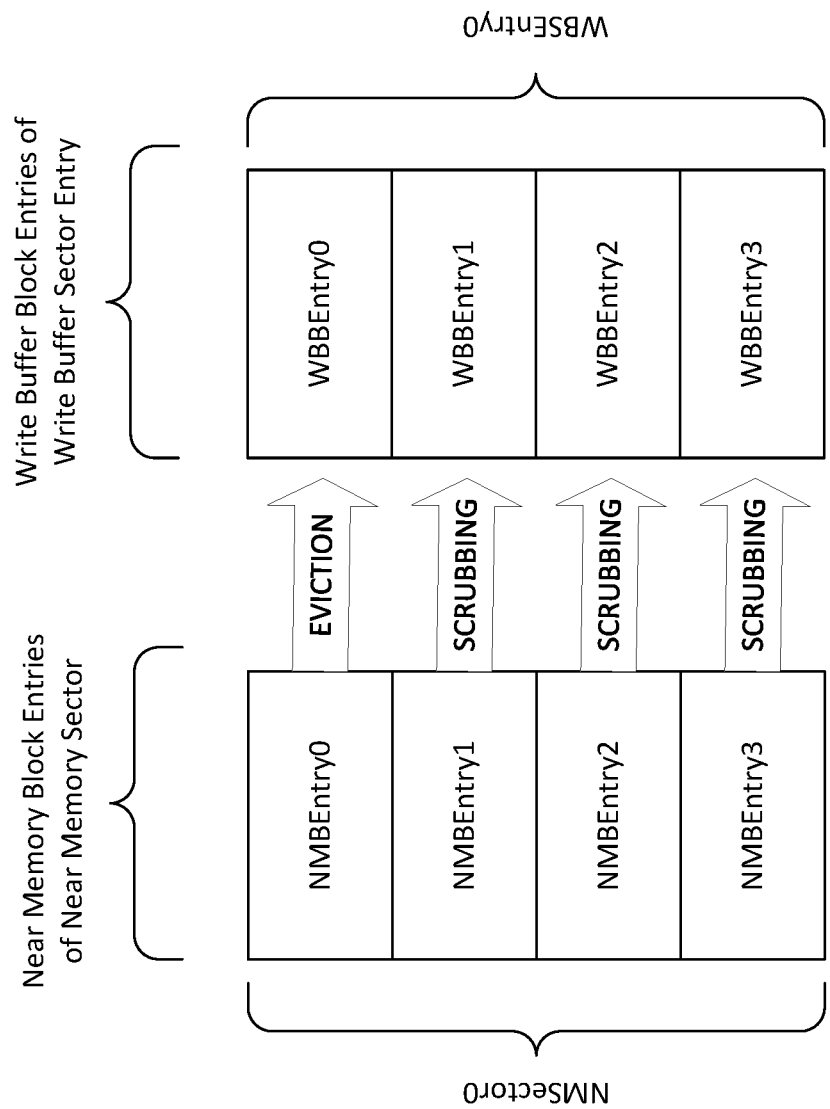
FIG. 9 is a chart depicting an example of operations employing aggregated write back in the embodiment of FIG. 8.

FIG. 8 depicts an example of write back operations for near memory block entries MBEntry0, NMBEntry1, NMBEntry2, NMBEntry3 (FIG. 9) of a near memory sector NMSector0 of the near memory 110a (FIG. 3) to the far memory 110b (FIG. 3) via write buffer block entries WBBEntry0, WBBEntry1, WBBEntry2, WBBEntry3 (FIG. 9) of a write buffer sector entry WBSEntry0 of the write buffer 144 (FIG. 3). Referring to FIGS. 8 and 9, upon a determination (block 304) by the cache logic 200 (FIG. 4) that a block of dirty data (which may be 64 bytes in size, for example), is to be evicted from the near memory 110a, the dirty block is evicted (block 308) from the near memory 110a to a corresponding block entry of a sector entry (256 bytes, for example) of the write buffer 144 (FIG. 3) associated with the near memory 110b. An arrow labeled "Eviction" in FIG. 9 represents the eviction of a block of dirty data from the near memory block entry NMBEntry0 for example, by the cache logic 200 (FIG. 4) for its subsequent transfer by the inter-memory transfer logic 216 to a corresponding write buffer block entry WBBEntry0 of a write buffer sector entry WBSEntry0 of the write buffer 144 (FIG. 3). As previously mentioned, near memory block entries such as the near memory block entry NMBEntry0 may be evicted from the near memory 110a in accordance with the cache eviction policy, to make room for data to be fetched from the far memory 110b. If the associated dirty bit dirtybit0 (FIG. 6) has been set indicating that the near memory block entry NMBEntry0 is dirty, it may be written back to the far memory in a write back operation (block 308).

In one aspect of the present description, the scrubbing logic 212 (FIG. 4) of the aggregated write back logic 130, is configured to automatically scrub one or more additional dirty, spatially co-located blocks of data of the same sector of data from which a spatially co-located dirty block of data was evicted by the cache logic 200. Accordingly, a determination is made (block 312) as to whether there are additional spatially co-located dirty blocks in the same sector as that from which a spatially co-located dirty block was evicted by the cache logic 200. In the example of FIG. 9, if the near memory block entry NMBEntry0, for example, is being evicted from the near memory sector entry NMSector0 of near memory 110a, and another spatially co-located block such as the near memory block entry NMBEntry1, for example, of the same near memory sector NMSector0 in this example, is indicated by its associated dirty bit dirtybit1 (FIG. 6), to be dirty, near memory block entry NMBEntry1 may be automatically scrubbed (block 316) by the scrubbing logic 212 in connection the eviction of near memory spatially co-located block entry NMBEntry0, as indicated by the arrow labeled "scrubbing" from the memory block entry NMBEntry1.

Accordingly, the near memory spatially co-located block entry NMBEntry1 is automatically read (block 316) from the near memory 110a by the scrubbing operation and is eventually copied (block 318) by the inter-memory transfer logic 216 to the corresponding write buffer block entry WBBEntry1 of the same write buffer sector entry WBSEntry0 of the write buffer 144. In this embodiment a copy of the data of the near memory block entry NMBEntry1 remains in the near memory 110a instead of being evicted. In addition, the scrubbing logic 212 is further configured to as a part of the scrubbing operation, reset (block 316) the associated dirty bit dirtybit1 of the scrubbed near memory spatially co-located block entry NMBEntry1 to indicate that the block of data remaining in the near memory block entry NMBEntry1 is characterized as clean since the scrubbed data will be stored at the corresponding address in the far memory 110b. Any additional spatially co-located blocks of the near memory sector entry NMSEntry0 which also contain dirty blocks spatially co-located with a spatially co-located dirty block being evicted are also scrubbed in this manner. In the example of FIG. 3, three spatially co-located dirty blocks are depicted as being scrubbed in association with the eviction of a spatially co-located dirty block from the near memory sector entry NMSEntry0. It is appreciated that the number of spatially co-located dirty blocks which are scrubbed in association with the eviction of a spatially co-located dirty block from the same near memory sector entry may vary, depending upon the particular application.

In this manner, the scrubbing logic 212 is configured to scrub one or more additional spatially co-located dirty blocks of data from the same sector of data in the near memory so that the additional spatially co-located dirty blocks of data of the same sector of data are read from the near memory and marked as clean in the near memory instead of being evicted from the near memory in accordance with the eviction policy. The inter-memory transfer logic 216 (FIG. 4) of the aggregated write back logic 130 writes back to the write buffer 144 for the far memory 110b, both the evicted spatially co-located block and any additional scrubbed spatially co-located blocks of data of a particular sector to provide an aggregated sector of data which includes the evicted spatially co-located block and the scrubbed spatially co-located blocks for storage in a write operation to the far memory 110b. In one embodiment, evicted and scrubbed spatially co-located dirty blocks are written back to the write buffer in back to back write operations. It is appreciated that the dirty blocks may be written back in other types of write operations, depending upon the particular application.

A determination is made (block 320) as to whether a particular write buffer sector entry is to be serviced. The write buffer sector entries may be serviced for write back to the far memory in accordance with a suitable scheduling policy. If a write buffer sector entry is to be serviced, a determination is made (block 324) as to whether the particular write buffer sector entry contains any invalid spatially co-located blocks of data. For example, a spatially co-located block of data in a write buffer sector entry may be invalid if an evicted or scrubbed spatially co-located block of dirty data has not been transferred to that particular block entry of the write buffer sector entry. However, it is appreciated that the coordinated operations of the cache logic 200 and the scrubbing logic 212 to evict and scrub, respectively, spatially co-located dirty blocks of a sector stored in the near memory 110a can reduce the number of invalid spatially co-located blocks of the write buffer sector entry being serviced. For example, if one spatially co-located dirty block is evicted to the particular write buffer sector entry and three additional spatially co-located dirty blocks are scrubbed and transferred to the write buffer sector entry as depicted in FIG. 9, there will be no invalid spatially co-located blocks of the write buffer sector being serviced.

If it is determined (block 324) that one or more write buffer spatially co-located block entries of a write buffer sector entry to be serviced nonetheless contain invalid data, valid replacement data is read (block 328) from the far memory 1226 to replace (block 332) invalid spatially co-located blocks with valid replacement spatially co-located blocks of data read (block 328) from the far memory 110b. However, it is appreciated that the number of such read and replacement operations may be reduced by the coordinated operations of the cache logic 200 and the scrubbing logic 212 to evict and scrub, respectively, spatially co-located dirty blocks of a sector stored in the near memory 110a which reduces the number of invalid spatially co-located blocks of the write buffer sector entry being serviced. The far memory addresses of the valid replacement data may be determined by near memory sector tag 204 (FIG. 5) which identifies the original far memory address of the far memory sector from which the evicted spatially co-located dirty block of the near memory sector entry NMSEntry0 was originally fetched.

Having replaced any invalid spatially co-located blocks of the sector of data with valid replacement spatially co-located blocks from the far memory 110b, a write operation writes back (block 336) a sector of data from the write buffer sector entry to the far memory at the sector address identified by the associated near memory sector tag 204 (FIG. 5). Here too, it is appreciated that the number of such sector write operations may be reduced by the coordinated operations of the cache logic 200 and the scrubbing logic 212 to evict and scrub, respectively, all of the existing spatially co-located dirty blocks of a sector stored in the near memory 110a. For example, absent the scrubbing logic 212, another spatially co-located dirty block of the same near memory sector entry NMSEntry0 may remain to be evicted (blocks 304, 308) in a subsequent eviction operation, resulting in another sector write operation (block 336). However, because all the existing spatially co-located dirty blocks of the same near memory sector entry NMSEntry0 were previously scrubbed (block 316) in the example of FIG. 8, in association with the initial eviction of a block from the near memory sector entry NMSEntry0, all the existing the spatially co-located dirty blocks (both evicted and scrubbed) were written back together in a single aggregated write back operation, obviating additional separate write back operations.

Figure 10:
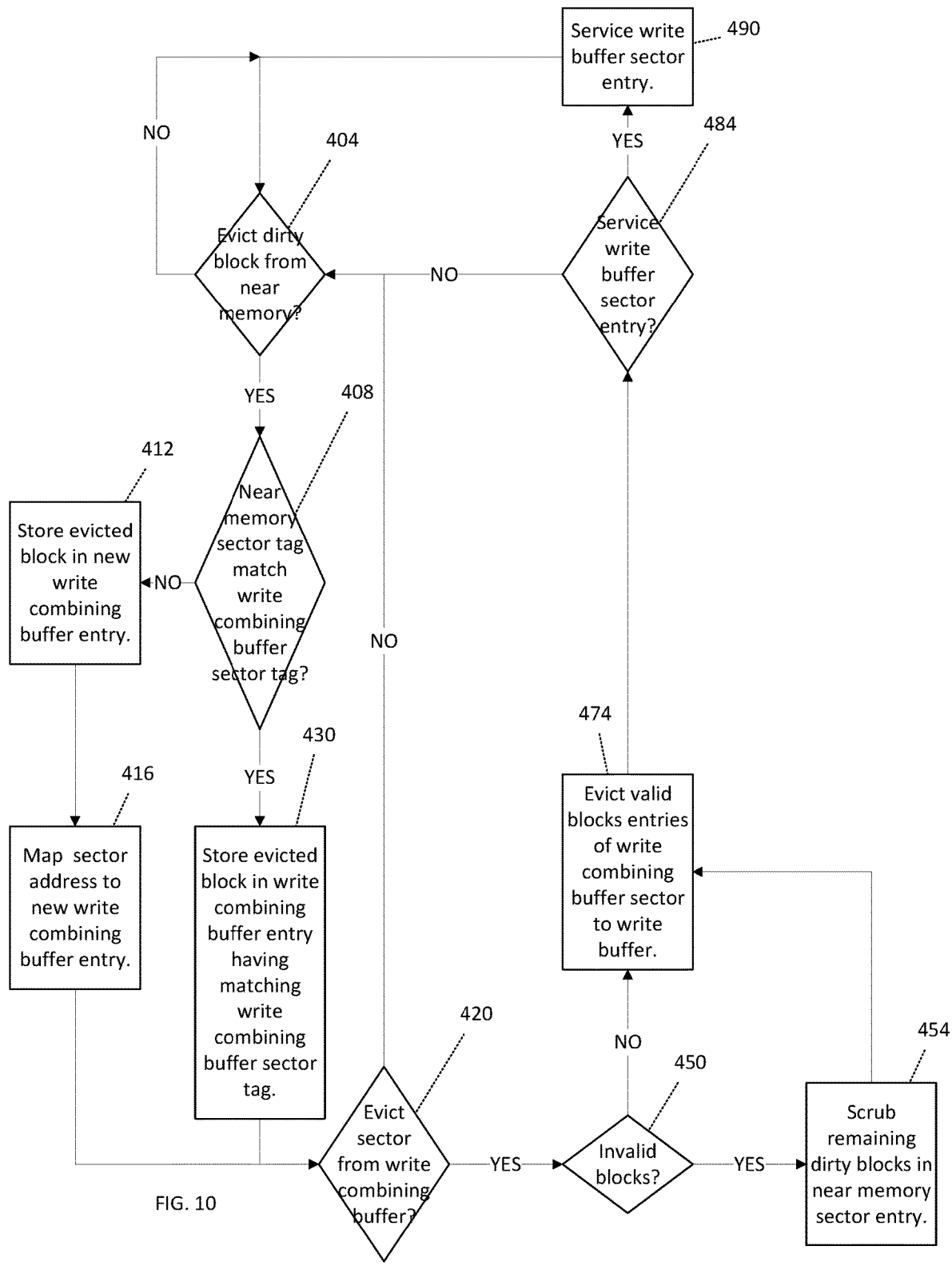
FIG. 10 depicts another embodiment of operations employing aggregated write back in a direct mapped two level memory in accordance with the present description.
Figure 11:
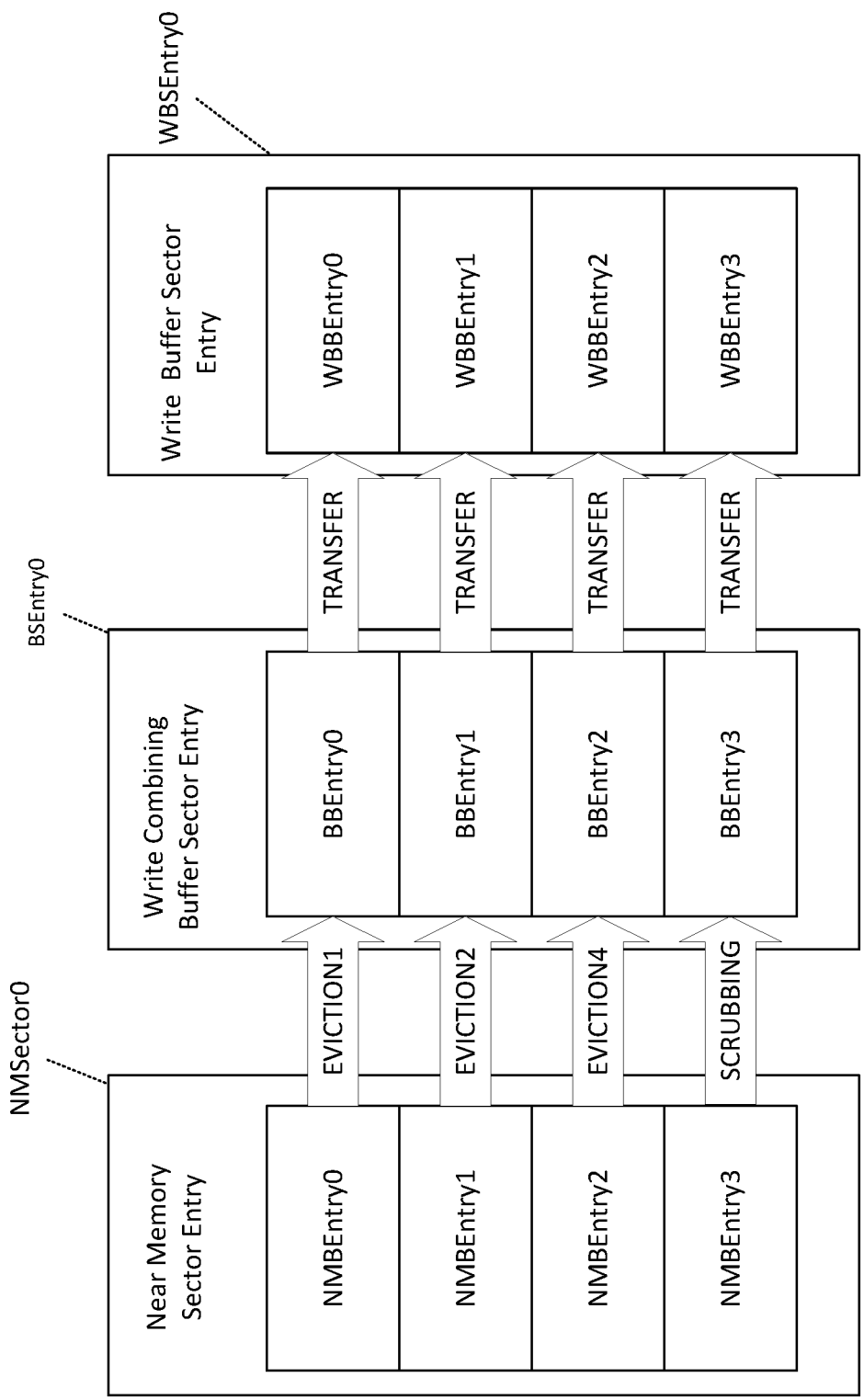
FIG. 11 is a chart depicting an example of operations employing aggregated write back in the embodiment of FIG. 10.

FIG. 10 depicts another example of write back operations for near memory block entries MBEntry0, NMBEntry1, NMBEntry2, NMBEntry3 (FIG. 11) of a near memory sector NMSector0 of the near memory 110a (FIG. 3) to the far memory 110b via a write buffer sector entry such as the write buffer sector entry0 of the write buffer 144. Referring to FIGS. 10, 11, in a manner similar to that described above in connection with FIG. 8, upon a determination (block 404) that a block of dirty data (which may be 64 bytes in size, for example), is to be evicted from the near memory 110a, the dirty block is evicted (block 408) from the near memory 110a for eventual transfer to a block entry of a sector entry (256 bytes, for example) of the write buffer 144 associated with the near memory 110b. An arrow labeled "Eviction1" in FIG. 11 represents the eviction of a block of dirty data from the near memory block entry NMBEntry0 for example, by the cache logic 200 for its eventual transfer by the inter-memory transfer logic 216 to the corresponding write buffer block entry WBBEntry0 of a write buffer sector entry WBSEntry0 of the write buffer 144 (FIG. 3). As previously mentioned, near memory block entries such as the near memory block entry NMBEntry0 may be evicted from the near memory 110a in accordance with the cache eviction policy, to make room for data to be fetched from the far memory 110b, if the associated dirty bit dirtybit0 (FIG. 6) has been set indicating that the near memory block entry NMBEntry0 is dirty and is a candidate for eviction in accordance with the eviction policy.

In one aspect of the embodiment of FIG. 10, a write combining buffer 224 (FIG. 4) is utilized to aggregate spatially co-located dirty blocks being evicted by the cache logic 200 before being transferred to a common write buffer sector entry to reduce near memory block entry scrubbing operations as described below. Accordingly, upon eviction of a block of data from a near memory block entry such as the near memory block entry NMBEntry0, for example, the write combining logic 220 compares (block 408) the data of the near memory sector tag 204 (FIG. 6) representing the far memory sector address mapped to the near memory sector entry which stored the evicted block of data, to data of each write combining buffer sector tag (FIG. 7) associated with each write combining buffer sector entry of the write combining buffer 224, until a match is located. If the near memory block entry NMBEntry0 is the first dirty block evicted from a particular near memory sector entry, no write combining buffer sector entry will have a matching write combining buffer sector tag 228. Accordingly, a new write combining buffer sector is allocated and the first evicted near memory block entry NMBEntry0 is temporarily stored (block 412) in the corresponding block entry of the newly allocated write combining buffer sector entry, such as the write combining buffer block entry BBEntry0 of the write combining buffer sector entry BSEntry0. This eviction and storing operation is represented by the arrow labeled "Eviction1" linking the near memory block entry NMBEntry0 to the write combining buffer block entry BBEntry0 of FIG. 10. In addition, the write combining logic 220 maps (block 416) the far memory sector address represented by the near memory sector tag 204 (FIG. 6) associated with the near memory sector entry NMSector0 from which the first near memory block entry NMBEntry0 was evicted, to the write combining buffer sector entry BSEntry0 of the write combining buffer 224, as represented by the write combining buffer sector tag 228 (FIG. 7) associated with the write combining buffer sector entry BSEntry0.

A determination is made (block 420) by the inter-memory transfer logic as to whether to evict a write combining buffer sector entry such as the write combining buffer sector entry BSEntry0, for example, from the write combining buffer 224. For example, if additional write combining buffer sector entries may not be allocated due to space considerations, an existing write combining buffer sector entry containing evicted blocks may itself be evicted from the write combining buffer 224 in accordance with a suitable eviction policy. If not, additional spatially co-located dirty blocks may be evicted from near memory sector entries, such as the near memory sector entry NMSEntry0, for example, and aggregated with other spatially co-located dirty blocks evicted to a write combining buffer sector entry having a matching write combining buffer sector tag, such as the tag 228 (FIG. 7).

It is noted that in this embodiment, scrubbing operations directed to a sector of data by the scrubbing logic are not triggered by the initial eviction of a block of dirty data from the same sector. Instead, as described below, scrubbing operations are deferred until the write combining buffer sector entry is evicted from the write combining buffer. As a result, additional spatially co-located dirty blocks of a sector may be evicted and aggregated in a write combining buffer sector entry having a matching write combining buffer sector tag in the course of on-going eviction operations, which can obviate scrubbing operations for those aggregated spatially co-located dirty blocks evicted from the near memory prior to the eviction of the write combining buffer sector entry. As a result, scrubbing memory operations to the near memory may be reduced for write back operations.

Accordingly, if it is determined (block 404) that another block of dirty data is to be evicted from the near memory 110a in accordance with the near memory eviction policy by the cache logic 200 prior to eviction (block 420) of a write combining buffer sector entry, the write combining logic 220 compares (block 408) the data of the near memory sector tag (FIG. 6) representing the far memory sector address mapped to the near memory sector entry which stored the evicted block of data, to data of each write combining buffer sector tag (FIG. 7) of each write combining buffer sector entry of the write combining buffer 224 until a match is located, if present. For example, if the additional block of dirty data being evicted is from the near memory block entry NMBEntry1 of the near memory sector entry NMSEntry0, and since the near memory block entry NMBEntry1 is, in this example, the second block evicted from the near memory sector entry NMSEntry0, a write combining buffer sector entry, that is, write combining buffer sector entry BSEntry0, in this example, will have a matching write combining buffer sector tag, that is, tag 228 in this example. Accordingly, the write combining buffer sector tag 228 of the write combining buffer sector entry BSEntry0 will match (block 408) the near memory sector tag 204 (FIG. 6) representing the far memory sector address mapped to the near memory sector entry NMSector0 from which the second dirty block was evicted. Accordingly, the second dirty block of the second near memory block entry NMBEntry1 is temporarily stored (block 430) in the corresponding block entry BBEntry1 of the write combining buffer sector entry BSEntry0 having the matching write combining buffer sector tag representing the mapped sector address, as represented by the arrow labeled "Eviction2" linking the near memory block entry NMBEntry1 to the write combining buffer block entry BBEntry1 of FIG. 10. Thus, spatially co-located dirty blocks of near memory block entries NMBEntry0, NMBEntry1 have been aggregated in the write combining buffer sector entry BSEntry0 without triggering scrubbing operations at this point. Again, a determination is made (block 420) by the intermemory transfer logic as to whether to evict a write combining buffer sector entry such as the write combining buffer sector entry BSEntry0, for example, from the write combining buffer 224. If not, an additional dirty block may be evicted from the near memory. Accordingly, if it is determined (block 404) that another block of dirty data is to be evicted from the near memory 110a in accordance with the near memory eviction policy by the cache logic 200, the write combining logic 220 compares (block 408) the data of the near memory sector tag (FIG. 6) representing the far memory sector address mapped to the near memory sector entry which stored the evicted block of data, to data of each write combining buffer sector tag (FIG. 7) associated with the write combining buffer sector entries of the write combining buffer 224 until a match is located, if present. For example, if the block of dirty data being evicted in this third eviction is not from the near memory sector entry NMSEntry0, the associated near memory sector tag will not match the write combining buffer sector tag 228 of the write combining buffer sector entry BSEntry0, and it will be stored (block 430) in a different existing write combining buffer sector entry having a matching write combining buffer sector tag if one can be located in the write combining buffer 224—otherwise a new write combining buffer sector entry is allocated for this evicted dirty block of the third eviction operation. If so, the dirty block of the third eviction operation is stored (block 412) in the newly allocated write combining buffer sector entry. Also the newly allocated write combining buffer sector entry is mapped (block 416) by storing in a write combining buffer sector tag associated with the newly allocated write combining buffer sector entry, data representing the far memory sector address mapped to the near memory sector location from which the dirty block of the third eviction was evicted, as represented by the associated near memory sector tag.

Again, a determination is made (block 420) by the intermemory transfer logic as to whether to evict a write combining buffer sector entry such as the write combining buffer sector entry BSEntry0, for example, from the write combining buffer 224. If not, yet another dirty block may be evicted from the near memory. Accordingly, if it is determined (block 404) that another block of dirty data is to be evicted in a fourth eviction operation from the near memory 110a in accordance with the near memory eviction policy by the cache logic 200 prior to eviction (block 420) of a write combining buffer sector entry, the write combining logic 220 compares (block 408) the data of the near memory sector tag 204 (FIG. 6) (representing the far memory sector address mapped to the near memory sector entry which stored the fourth evicted block of data), to data of each write combining buffer sector tag (FIG. 7) associated with the write combining buffer sector entries of the write combining buffer 224 until a match, if present, is located. For example, if the fourth block of dirty data being evicted is from the near memory block entry NMBEntry2 of the near memory sector entry NMSEntry0, and since the near memory block entry NMBEntry2 is not the first block evicted from the near memory sector entry NMSEntry0, a write combining buffer sector entry, will have a matching write combining buffer sector tag. In this example, the write combining buffer sector tag 228 of the write combining buffer sector entry BSEntry0 will match (block 408) the near memory sector tag 204 (FIG. 6) representing the far memory sector address mapped to the near memory sector entry NMSector0 from which the third spatially co-located dirty block was evicted. Accordingly, the third spatially co-located dirty block of the third near memory block entry NMBEntry2 is temporarily stored (block 430) in the corresponding block entry BBEntry2 of the write combining buffer sector entry BSEntry0 having the matching write combining buffer sector tag storing the mapped far memory sector address, as represented by the arrow labeled "Eviction4" linking the near memory block entry NMBEntry2 to the write combining buffer block entry BBEntry2 of FIG. 11. Thus, evicted spatially co-located dirty blocks of near memory block entries NMBEntry0, NMBEntry1, NMBEntry1 have been aggregated in the write combining buffer sector entry BSEntry0 without triggering scrubbing operations at this point. As a result, scrubbing operations and hence read operations directed to the near memory may be reduced by consolidating spatially co-located dirty block evictions in a write combining buffer sector entry having a matching write combining buffer sector tag, before performing scrubbing operations for any remaining spatially co-located dirty blocks of the sector. The metadata bits validitybit0, validitybit2, validitybit3 (FIG. 7) associated with the write combining buffer block entries BBEntry0, BBEntry2, BBEntry3, respectively of the write combining buffer sector entry BSEntry0 may be reset to indicate that those write combining buffer block entries are valid, since evicted spatially co-located dirty blocks of near memory block entries NMBEntry0, NMBEntry1, NMBEntry1 have been aggregated in those write combining buffer block entries.

Again, a determination is made (block 420) by the intermemory transfer logic as to whether to evict a write combining buffer such as the write combining buffer sector entry BSEntry0, for example, from the write combining buffer 224. Once it is determined that the write combining buffer sector entry BSEntry0, for example, is to be evicted from the write combining buffer 224, one or more scrubbing operations may be triggered by the eviction of the write combining buffer sector entry BSEntry0. However, because many if not all of spatially co-located dirty blocks of the near memory sector entry NMSEntry0 may have already been evicted and stored in the write combining buffer sector entry BSEntry0 by the cache logic, scrubbing operations by the scrubbing logic may be reduced or eliminated, depending upon if dirty blocks remain to be scrubbed.

Accordingly, having determined (block 420) to evict the write combining buffer sector entry BSEntry0 from the write combining buffer 224, a determination is made (block 450) as to whether the write combining buffer sector entry BSEntry0 contains any invalid blocks of data. For example, a block of data in the write combining buffer sector entry BSEntry0 may be invalid if a spatially co-located block of dirty data in the near memory sector entry NMSector0 was not evicted and transferred to the corresponding block entry of the write combining buffer sector entry BSEntry0. In the example of FIG. 11, the near memory block entry NMBEntry3 of the near memory sector entry NMSector0 contains a block of dirty data which had not been evicted by the time the write combining buffer sector entry BSEntry0 was selected to be evicted (block 420). Accordingly, the metadata validitybit3 associated with the write combining buffer block entry BBEntry3 of the write combining buffer sector entry BSEntry0 remains set to indicate that the write combining buffer block entry BBEntry3 continues to contain invalid data.

For each write combining buffer spatially co-located block entry having a metadata bit indicating that the write combining buffer block entry of the write combining buffer sector entry being evicted contains invalid data, the corresponding block of dirty data if present in the near memory, is scrubbed (block 454) from the near memory. In the scrubbing operation, the block of dirty data being scrubbed is read from the near memory, stored in the corresponding write combining buffer block entry of the write combining buffer sector entry being evicted, and the corresponding metadata bit is reset to indicate that the write combining buffer block entry no longer contains invalid data. Alternatively, the write combining buffer sector entry may be bypassed and the spatially co-located dirty block may be transferred directly to the corresponding block entry of the write buffer sector entry as a part of the write combining buffer sector eviction procedure. Conversely, if a corresponding block of dirty data is not present in the near memory, the metadata associated with a write combining buffer block entry of the write combining buffer sector entry BSEntry0 remains set to indicate that the write combining buffer block entry continues to contain invalid data.

In the example of FIG. 11, the metadata bit validitybit3 (FIG. 7) associated with the write combining buffer block entry BBEntry3 of the write combining buffer sector entry BSEntry0 is set to indicate that the write combining buffer block entry BBEntry3 is invalid and therefore a spatially co-located dirty block of data of the near memory block entry NMBEntry3 is scrubbed (block 474). Accordingly, a fourth dirty block of data from the spatially co-located near memory block entry NMBEntry3 is temporarily stored (block 474) in the corresponding block entry BBEntry3 of the write combining buffer sector entry BSEntry0 being evicted, as represented by the arrow labeled "Scrubbing" linking the near memory block entry NMBEntr3 to the write combining buffer block entry BBEntry3 of FIG. 11. Further, the metadata bit validitybit3 (FIG. 7) associated with the write combining buffer block entry BBEntry3 of the write combining buffer sector entry BSEntry0 may be reset to indicate that the data of the write combining buffer block entry BBEntry3 is now valid. Alternatively, the write combining buffer sector entry BBEntry3 may be bypassed and the data of the spatially co-located dirty block entry NMBEntr3 may be transferred directly to the corresponding block entry WBBEntry3 of the write buffer sector entry as a part of the eviction of the write combining buffer sector entry BSEntry0.

In this example, all dirty blocks of the near memory sector entry NMSEntry0 have been either evicted (blocks 412, 430) as represented by the arrows labeled Eviction1, Eviction2, Eviction3 (FIG. 11), or scrubbed (block 474) as represented by the arrow labeled Scrubbing in FIG. 11. Thus, evicted spatially co-located dirty blocks of near memory block entries NMBEntry0, NMBEntry1, NMBEntry2 and scrubbed spatially co-located dirty block of near memory block entry NMBEntry3 have been aggregated in the write combining buffer sector entry BSEntry0 at this point. Accordingly, the valid block entries of the write combining buffer sector entry BSEntry0 in this example, are evicted (block 474) to corresponding block entries of a sector entry WBSEntry0 of the write buffer, as represented by the four arrows labeled "transfer" in the example of FIG. 11. In one embodiment, evicted and scrubbed spatially co-located dirty blocks are written back to the write buffer in back to back write operations. It is appreciated that the dirty blocks may be written back in other types of write operations, depending upon the particular application.

Accordingly, a determination is made (block 484) as to whether a particular write buffer sector entry is to be serviced. If so, the write buffer sector entry may be serviced (block 490) in a manner similar to that described above in connection with the write buffer sector servicing operations of blocks 324 to 336 of FIG. 8. Thus, a determination is made as to whether the particular write buffer sector entry contains any invalid blocks of data. For example, a block of data in a write buffer sector entry may be invalid if an evicted or scrubbed block of dirty data has not been transferred to that particular block entry of the write buffer sector entry. However, it is appreciated that the coordinated operations of the cache logic 200 and the scrubbing logic 212 to evict and scrub, respectively, spatially co-located dirty blocks of a sector stored in the near memory 110a can reduce the number of invalid blocks of the write buffer sector entry being serviced. For example, if three spatially co-located dirty blocks are evicted to the write combining buffer and transferred to a particular write buffer sector entry and an additional spatially co-located dirty block is scrubbed and transferred to the same write buffer sector entry as depicted in FIG. 11, there will be no invalid blocks of the write buffer sector being serviced.

If it is determined that one or more write buffer block entries of a write buffer sector entry to be serviced nonetheless contain invalid data, valid replacement data is read in a manner similar to that described above in connection with block 328 of FIG. 8 from the far memory to replace invalid blocks with valid replacement blocks of data read from the far memory 110b. However, it is appreciated that the number of such read and replacement operations may be reduced by the coordinated operations of the cache logic 200 and the scrubbing logic 212 to evict and scrub, respectively, spatially co-located dirty blocks of a sector stored in the near memory 110a which reduces the number of invalid blocks of the write buffer sector entry being serviced. The far memory addresses of the valid replacement data may be determined by metadata such as the near memory sector tag 204 (FIG. 5) which identifies the original far memory address of the far memory sector from which the evicted dirty block of the sector entry NMSEntry0 was originally fetched.

Having replaced any invalid blocks of the sector of data with valid replacement blocks from the far memory 110b, a write operation writes back in a manner similar to that described above in connection with block 336 of FIG. 8 a sector of data from the write buffer sector entry to the far memory at the sector address identified by the associated near memory sector tag 204 (FIG. 5). Here too, it is appreciated that the number of such sector write operations may be reduced by the coordinated operations of the cache logic 200 and the scrubbing logic 212 to evict and scrub, respectively, all of the existing spatially co-located dirty blocks of a sector stored in the near memory 110a. For example, absent the cache logic 200 or the scrubbing logic 212, another spatially co-located dirty block of the same near memory sector entry NMSEntry0 may remain to be evicted in a subsequent eviction operation, which could result in another sector write operation. However, because all the existing spatially co-located dirty blocks of the same near memory sector entry NMSEntry0 were previously evicted (block 412, 430, FIG. 10) or scrubbed (block 454) prior to eviction of the write combining buffer sector entry, all the existing the dirty blocks (both evicted and scrubbed) were written back together to the far memory in a write back operation to the far memory, obviating additional separate write back operations to the far memory.

It is appreciated that the operations depicted in the figures may be performed by memory interface logic having aggregated write back utilizing architectures other than that depicted in the figures and employing other types of logic components. The logic components discussed herein including the logic elements depicted in figures may be configured to perform the described operations using appropriate hardware, software or firmware, or various combinations thereof. The software may be in the form of firmware, programs, drivers and other instruction sets, and the hardware may be in the form of general purpose logic devices such as microprocessors or specific purpose logic devices such as a memory controller, DMA controller or engine or ASIC device, for example.

The hardware, software or firmware for devices employing aggregated write back in accordance with the present description, may be physically or logically located in any component of the system including the memory itself, a controller such as a memory controller, DMA controller, a microprocessor, etc. Thus, in one embodiment, one or more of the memory interface logic elements depicted in the figures, may be implemented with one or more of hardware of a memory controller, firmware for a memory controller, and software such as associated driver software of a memory controller. In another embodiment, one or more of the memory interface logic elements depicted in the figures may be implemented with one or more of controller hardware such as the central processing unit, for example, or other controller, firmware for the controller hardware and software for the controller hardware such as programs and drivers executed by the controller hardware such as a central processing unit for example. In another embodiment, one or more of the memory interface logic elements depicted in the figures may be implemented with hardware, firmware or software for both an offload data transfer engine and a central processing unit, for example.

It is appreciated that devices employing aggregated write back in accordance with the present description can, depending upon the particular application, enhance or maximize spatial locality and improve system performance. Other aspects may be achieved, depending upon the particular application.

EXAMPLES

The following examples pertain to further embodiments.

Example 1 is an apparatus for use with near and far memories having memory entries at memory addresses, comprising:

a near memory controller configured to control memory operations for the near memory at a first level of granularity defined by a subunit of units of data, said near memory controller including:

cache logic configured to control memory operations for the near memory as a direct mapped cache for the far memory in which spatially co-located subunit addresses within a data unit of the far memory are direct mapped to spatially co-located subunit entries of a data unit of the near memory, said cache logic being further configured to evict from the near memory in accordance with an eviction policy, a first dirty subunit of a first unit of data stored in the near memory at a first memory entry to which a corresponding first far memory address is direct mapped to the first memory entry, scrubbing logic configured to scrub an additional dirty subunit of data spatially co-located with the first dirty subunit in the first unit of data stored at the first memory address of the near memory so that the additional spatially co-located subunit of data of the first unit of data is read from the near memory and marked as clean in the near memory instead of being evicted from the near memory in accordance with the eviction policy, and inter-memory transfer logic configured to write back the evicted first subunit of data and the scrubbed additional spatially co-located subunit of data of the first unit of data to provide a unit of data which includes the evicted first subunit of data and the scrubbed additional spatially co-located subunit of data to store as a unit of data in the far memory at the first far memory address direct mapped to the first memory entry.

In Example 2, the subject matter of Examples 1-8 (excluding the present Example) can optionally include wherein the near memory is configured to store for each subunit of data stored in the near memory an associated dirty metadata bit which when set indicates that the associated subunit of data is dirty, and wherein the scrubbing logic is further configured to reset the dirty metadata bit associated with a scrubbed subunit of data to indicate that the scrubbed subunit of data is clean.

In Example 3, the subject matter of Examples 1-8 (excluding the present Example) can optionally include wherein the scrubbing logic is further configured to automatically scrub an additional spatially co-located dirty subunit of data of the first unit of data in response to the eviction of the first subunit of data of the first unit of data from the near memory in accordance with the eviction policy.

In Example 4, the subject matter of Examples 1-8 (excluding the present Example) can optionally include wherein the near memory is further configured to store for each spatially co-located subunit of data stored in the near memory, a tag representing a corresponding far memory address of the far memory direct mapped to the near memory entry stored in the near memory, and wherein the near memory controller further includes write combining logic having a write combining buffer having a plurality of write combining buffer entries, each write combining buffer entry configured to store a unit of data, and wherein the write combining logic is further configured to store the evicted first subunit of data in a first write combining buffer entry and to associate a tag representing the first far memory address direct mapped to the first memory entry, with the first write combining buffer entry, and wherein the cache logic is further configured to evict from the near memory in accordance with the eviction policy, a second dirty subunit of a unit of data, and wherein the write combining logic is further configured to:

compare the far memory address direct mapped to the near memory entry which stored the second evicted subunit of data, to the tag representing the first far memory address direct mapped to the first memory entry, and associated with the first write combining buffer entry, store the second evicted subunit of data in the first write combining buffer entry if the far memory address direct mapped to the near memory entry which stored the second evicted subunit of data, matches the tag representing the first far memory address direct mapped to the first memory entry and associated with the first write combining buffer entry such that the second dirty subunit of data is spatially co-located with the evicted first subunit of data, and to evict a unit of data from the first write combining buffer entry, and wherein the inter-memory transfer logic is further configured to write back the unit of data evicted from the first write combining buffer entry to provide a unit of data which includes the evicted first and second spatially co-located subunits of data to store as a unit of data in the far memory at the first far memory address direct mapped to the first memory entry.

In Example 5, the subject matter of Examples 1-8 (excluding the present Example) can optionally include wherein the write combining logic includes metadata memory configured to store for each subunit of data stored in a write combining buffer entry, an associated validity metadata bit which when set indicates that the associated subunit of data stored in a write combining buffer entry is invalid, and wherein the scrubbing logic is further configured to, in association with eviction of a unit of data from the first write combining buffer entry, detect as a function of a state of an invalidity metadata bit that a subunit of data in the first write combining buffer entry is invalid, and in response to detecting that a subunit of data in the first write combining buffer entry is invalid, to scrub a spatially co-located subunit of data of the unit from the near memory to replace the invalid subunit of data and wherein the unit of data provided by the inter-memory transfer logic includes evicted and scrubbed spatially co-located subunits of data from the near memory.

In Example 6, the subject matter of Examples 1-8 (excluding the present Example) can optionally include wherein the write combining logic is further configured to:

store the second evicted subunit of data in a second write combining buffer entry if the far memory address direct mapped to the near memory entry which stored the second evicted subunit of data, fails to match the tag representing the first far memory address direct mapped to the first memory entry and associated with the first write combining buffer entry such that the second dirty subunit of data is not spatially co-located with the evicted first subunit of data, and to associate a tag representing the far memory address direct mapped to the near memory entry which stored the second evicted subunit of data, with the second write combining buffer entry.

In Example 7, the subject matter of Examples 1-8 (excluding the present Example) can optionally include wherein a unit of data is a sector of data and a subunit of data is a block of data in which a sector of data includes a plurality of blocks of data.

In Example 8, the subject matter of Examples 1-8 (excluding the present Example) can optionally include a system comprising:

a central processing unit, a near memory having near memory entries at near memory addresses, a far memory having far memory entries at far memory addresses, said near memory controller, and at least one of a display communicatively coupled to the central processing unit, a network interface communicatively coupled to the central processing unit, and a battery coupled to provide power to the system.

Example 9 is a method, comprising:

evicting from a near memory in accordance with an eviction policy, a first dirty subunit of a first unit of data stored in the near memory at a first memory entry to which a corresponding first far memory address is direct mapped to the first memory entry, scrubbing an additional dirty subunit of data spatially co-located with the first dirty subunit in the first unit of data stored at the first memory address of the near memory so that the additional spatially co-located subunit of data of the first unit of data is read from the near memory and marked as clean in the near memory instead of being evicted from the near memory in accordance with the eviction policy, and writing back the evicted first subunit of data and the scrubbed additional spatially co-located subunit of data of the first unit of data to provide a unit of data which includes the evicted first subunit of data and the scrubbed additional spatially co-located subunit of data to store as a unit of data in the far memory at the first far memory address direct mapped to the first memory entry.

In Example 10, the subject matter of Examples 9-15 (excluding the present Example) can optionally include wherein scrubbing an additional subunit of data includes reading the additional subunit of data from the near memory and resetting a dirty metadata bit associated with the additional subunit of data read from the near memory to indicate that the scrubbed subunit of data is clean.

In Example 11, the subject matter of Examples 9-15 (excluding the present Example) can optionally include wherein scrubbing an additional subunit of data of the unit of data from the near memory includes automatically scrubbing an additional subunit of data of the unit of data from the near memory in response to evicting the first subunit of data from the first memory in accordance with the eviction policy.

In Example 12, the subject matter of Examples 9-15 (excluding the present Example) can optionally include wherein the evicting includes:

storing the first subunit of data in a first entry of a write combining buffer wherein the first write combining buffer entry has a data storage capacity of at least one unit of data, associating a tag representing the first far memory address direct mapped to the first memory entry, with the first write combining buffer entry, evicting from the near memory in accordance with the eviction policy, a second dirty subunit of a unit of data, comparing the far memory address direct mapped to the near memory entry which stored the second evicted subunit of data, to the tag representing the first far memory address direct mapped to the first memory entry, and associated with the first write combining buffer entry, and storing the second evicted subunit of data in the first write combining buffer entry if the far memory address direct mapped to the near memory entry which stored the second evicted subunit of data, matches the tag representing the first far memory address direct mapped to the first memory entry and associated with the first write combining buffer entry such that the second dirty subunit of data is spatially co-located with the evicted first subunit of data, and wherein writing back the evicted first subunit of data and the scrubbed additional spatially co-located subunit of data of the first unit of data includes evicting a unit of data from the first write combining buffer entry and writing the evicted unit of data to a write buffer of a memory controller for the far memory.

In Example 13, the subject matter of Examples 9-15 (excluding the present Example) can optionally include wherein evicting a unit of data from the first write combining buffer entry includes detecting as a function of a state of an invalidity metadata bit that a subunit of data in the first write combining buffer entry is invalid, and in response to detecting that a subunit of data in the first write combining buffer entry is invalid, scrubbing a spatially co-located subunit of data of the unit of data from the near memory to replace the invalid subunit of data and wherein the evicted unit of data written to the write buffer of the memory controller for the far memory includes evicted and scrubbed spatially co-located subunits of data from the near memory.

In Example 14, the subject matter of Examples 9-15 (excluding the present Example) can optionally include storing the second evicted subunit of data in a second write combining buffer entry if the far memory address direct mapped to the near memory entry which stored the second evicted subunit of data, fails to match the tag representing the first far memory address direct mapped to the first memory entry and associated with the first write combining buffer entry such that the second dirty subunit of data is not spatially co-located with the evicted first subunit of data, and associating a tag representing the far memory address direct mapped to the near memory entry which stored the second evicted subunit of data, with the second write combining buffer entry.

In Example 15, the subject matter of Examples 9-15 (excluding the present Example) can optionally include wherein a unit of data is a sector of data and a subunit of data is a block of data in which a sector of data includes a plurality of blocks of data.

Example 16 is an apparatus comprising means to perform a method as claimed in any preceding claim.

Example 17 is a system comprising:
a central processing unit,
a near memory having near memory entries at near memory addresses,
a far memory having far memory entries at far memory addresses, and
a near memory controller configured to control memory operations for the near memory at a first level of granularity defined by a subunit of units of data, said near memory controller including:
cache logic configured to control memory operations for the near memory as a direct mapped cache for the far memory in which spatially co-located subunit addresses within a data unit of the far memory are direct mapped to spatially co-located subunit entries of a data unit of the near memory, said cache logic being further configured to evict from the near memory in accordance with an eviction policy, a first dirty subunit of a first unit of data stored in the near memory at a first memory entry to which a corresponding first far memory address is direct mapped to the first memory entry,
scrubbing logic configured to scrub an additional dirty subunit of data spatially co-located with the first dirty subunit in the first unit of data stored at the first memory address of the near memory so that the additional spatially co-located subunit of data of the first unit of data is read from the near memory and marked as clean in the near memory instead of being evicted from the near memory in accordance with the eviction policy, and
inter-memory transfer logic configured to write back the evicted first subunit of data and the scrubbed additional spatially co-located subunit of data of the first unit of data to provide a unit of data which includes the evicted first subunit of data and the scrubbed additional spatially co-located subunit of data to store as a unit of data in the far memory at the first far memory address direct mapped to the first memory entry.

In Example 18, the subject matter of Examples 17-24 (excluding the present Example) can optionally include wherein the near memory is configured to store for each subunit of data stored in the near memory an associated dirty metadata bit which when set indicates that the associated subunit of data is dirty, and wherein the scrubbing logic is further configured to reset the dirty metadata bit associated with a scrubbed subunit of data to indicate that the scrubbed subunit of data is clean.

In Example 19, the subject matter of Examples 17-24 (excluding the present Example) can optionally include wherein the scrubbing logic is further configured to automatically scrub an additional spatially co-located dirty subunit of data of the first unit of data in response to the eviction of the first subunit of data of the first unit of data from the near memory in accordance with the eviction policy.

In Example 20, the subject matter of Examples 17-24 (excluding the present Example) can optionally include wherein the near memory is further configured to store for each spatially co-located subunit of data stored in the near memory, a tag representing a corresponding far memory address of the far memory direct mapped to the near memory entry stored in the near memory, and wherein the near memory controller further includes write combining logic having a write combining buffer having a plurality of write combining buffer entries, each write combining buffer entry configured to store a unit of data, and wherein the write combining logic is further configured to store the evicted first subunit of data in a first write combining buffer entry and to associate a tag representing the first far memory address direct mapped to the first memory entry, with the first write combining buffer entry,
and wherein the cache logic is further configured to evict from the near memory in accordance with the eviction policy, a second dirty subunit of a unit of data,
and wherein the write combining logic is further configured to:
compare the far memory address direct mapped to the near memory entry which stored the second evicted subunit of data, to the tag representing the first far memory address direct mapped to the first memory entry, and associated with the first write combining buffer entry,
store the second evicted subunit of data in the first write combining buffer entry if the far memory address direct mapped to the near memory entry which stored the second evicted subunit of data, matches the tag representing the first far memory address direct mapped to the first memory entry and associated with the first write combining buffer entry such that the second dirty subunit of data is spatially co-located with the evicted first subunit of data, and
to evict a unit of data from the first write combining buffer entry,
and wherein the inter-memory transfer logic is further configured to write back the unit of data evicted from the first write combining buffer entry to provide a unit of data which includes the evicted first and second spatially co-located subunits of data to store as a unit of data in the far memory at the first far memory address direct mapped to the first memory entry.

In Example 21, the subject matter of Examples 17-24 (excluding the present Example) can optionally include wherein the write combining logic includes metadata memory configured to store for each subunit of data stored in a write combining buffer entry, an associated validity metadata bit which when set indicates that the associated subunit of data stored in a write combining buffer entry is invalid, and wherein the scrubbing logic is further configured to, in association with eviction of a unit of data from the first write combining buffer entry, detect as a function of a state of an invalidity metadata bit that a subunit of data in the first write combining buffer entry is invalid, and in response to detecting that a subunit of data in the first write combining buffer entry is invalid, to scrub a spatially co-located subunit of data of the unit from the near memory to replace the invalid subunit of data and wherein the unit of data provided by the inter-memory transfer logic includes evicted and scrubbed spatially co-located subunits of data from the near memory.

In Example 22, the subject matter of Examples 17-24 (excluding the present Example) can optionally include wherein the write combining logic is further configured to:

store the second evicted subunit of data in a second write combining buffer entry if the far memory address direct mapped to the near memory entry which stored the second evicted subunit of data, fails to match the tag representing the first far memory address direct mapped to the first memory entry and associated with the first write combining buffer entry such that the second dirty subunit of data is not spatially co-located with the evicted first subunit of data, and to associate a tag representing the far memory address direct mapped to the near memory entry which stored the second evicted subunit of data, with the second write combining buffer entry.

In Example 23, the subject matter of Examples 17-24 (excluding the present Example) can optionally include wherein a unit of data is a sector of data and a subunit of data is a block of data in which a sector of data includes a plurality of blocks of data.

In Example 24, the subject matter of Examples 17-24 (excluding the present Example) can optionally include at least one of:

a display communicatively coupled to the central processing unit, a network interface communicatively coupled to the central processing unit, and a battery coupled to provide power to the system.

Example 25 is an apparatus for use with near and far memories having memory entries at memory addresses, comprising:

a near memory controller means for controlling memory operations for the near memory at a first level of granularity defined by a subunit of units of data, said near memory controller means including:

cache logic means for controlling memory operations for the near memory as a direct mapped cache for the far memory in which spatially co-located subunit addresses within a data unit of the far memory are direct mapped to spatially co-located subunit entries of a data unit of the near memory, said cache logic means being further configured for evicting from the near memory in accordance with an eviction policy, a first dirty subunit of a first unit of data stored in the near memory at a first memory entry to which a corresponding first far memory address is direct mapped to the first memory entry, scrubbing logic means for scrubbing an additional dirty subunit of data spatially co-located with the first dirty subunit in the first unit of data stored at the first memory address of the near memory so that the additional spatially co-located subunit of data of the first unit of data is read from the near memory and marked as clean in the near memory instead of being evicted from the near memory in accordance with the eviction policy, and inter-memory transfer logic means for writing back the evicted first subunit of data and the scrubbed additional spatially co-located subunit of data of the first unit of data to provide a unit of data which includes the evicted first subunit of data and the scrubbed additional spatially co-located subunit of data to store as a unit of data in the far memory at the first far memory address direct mapped to the first memory entry.

In Example 26, the subject matter of Examples 25-32 (excluding the present Example) can optionally include wherein the near memory is configured to store for each subunit of data stored in the near memory an associated dirty metadata bit which when set indicates that the associated subunit of data is dirty, and wherein the scrubbing logic means is further configured for resetting the dirty metadata bit associated with a scrubbed subunit of data to indicate that the scrubbed subunit of data is clean.

In Example 27, the subject matter of Examples 25-32 (excluding the present Example) can optionally include wherein the scrubbing logic means is further configured for automatically scrubbing an additional spatially co-located dirty subunit of data of the first unit of data in response to the eviction of the first subunit of data of the first unit of data from the near memory in accordance with the eviction policy.

In Example 28, the subject matter of Examples 25-32 (excluding the present Example) can optionally include wherein the near memory is further configured to store for each spatially co-located subunit of data stored in the near memory, a tag representing a corresponding far memory address of the far memory direct mapped to the near memory entry stored in the near memory, and wherein the near memory controller means further includes write combining logic means having a write combining buffer having a plurality of write combining buffer entries, each write combining buffer entry configured to store a unit of data, and wherein the write combining logic means is further configured for storing the evicted first subunit of data in a first write combining buffer entry and for associating a tag representing the first far memory address direct mapped to the first memory entry, with the first write combining buffer entry, and wherein the cache logic means is further configured for evicting from the near memory in accordance with the eviction policy, a second dirty subunit of a unit of data, and wherein the write combining logic means is further configured for:

comparing the far memory address direct mapped to the near memory entry which stored the second evicted subunit of data, to the tag representing the first far memory address direct mapped to the first memory entry, and associated with the first write combining buffer entry, storing the second evicted subunit of data in the first write combining buffer entry if the far memory address direct mapped to the near memory entry which stored the second evicted subunit of data, matches the tag representing the first far memory address direct mapped to the first memory entry and associated with the first write combining buffer entry such that the second dirty subunit of data is spatially co-located with the evicted first subunit of data, and evicting a unit of data from the first write combining buffer entry, and wherein the inter-memory transfer logic means is further configured for writing back the unit of data evicted from the first write combining buffer entry to provide a unit of data which includes the evicted first and second spatially co-located subunits of data to store as a unit of data in the far memory at the first far memory address direct mapped to the first memory entry.

In Example 29, the subject matter of Examples 25-32 (excluding the present Example) can optionally include wherein the write combining logic means includes metadata memory configured to store for each subunit of data stored in a write combining buffer entry, an associated validity metadata bit which when set indicates that the associated subunit of data stored in a write combining buffer entry is invalid, and wherein the scrubbing logic means is further configured for, in association with eviction of a unit of data from the first write combining buffer entry, detecting as a function of a state of an invalidity metadata bit that a subunit of data in the first write combining buffer entry is invalid, and in response to detecting that a subunit of data in the first write combining buffer entry is invalid, for scrubbing a spatially co-located subunit of data of the unit from the near memory to replace the invalid subunit of data and wherein the unit of data provided by the inter-memory transfer logic means includes evicted and scrubbed spatially co-located subunits of data from the near memory.

In Example 30, the subject matter of Examples 25-32 (excluding the present

Example) can optionally include wherein the write combining logic means is further configured for:

storing the second evicted subunit of data in a second write combining buffer entry if the far memory address direct mapped to the near memory entry which stored the second evicted subunit of data, fails to match the tag representing the first far memory address direct mapped to the first memory entry and associated with the first write combining buffer entry such that the second dirty subunit of data is not spatially co-located with the evicted first subunit of data, and associating a tag representing the far memory address direct mapped to the near memory entry which stored the second evicted subunit of data, with the second write combining buffer entry.

In Example 31, the subject matter of Examples 25-32 (excluding the present Example) can optionally include wherein a unit of data is a sector of data and a subunit of data is a block of data in which a sector of data includes a plurality of blocks of data.

In Example 32, the subject matter of Examples 25-32 (excluding the present Example) can optionally include a system comprising:

a central processing unit, a near memory having near memory entries at near memory addresses, a far memory having far memory entries at far memory addresses, said near memory controller means, and at least one of a display communicatively coupled to the central processing unit, a network interface communicatively coupled to the central processing unit, and a battery coupled to provide power to the system.

Example 33 is a computer program product for a computing system wherein the computer program product comprises a computer readable storage medium having program instructions embodied therewith, the program instructions executable by a processor of the computing system to cause operations, the operations comprising:

evicting from a near memory in accordance with an eviction policy, a first dirty subunit of a first unit of data stored in the near memory at a first memory entry to which a corresponding first far memory address is direct mapped to the first memory entry, scrubbing an additional dirty subunit of data spatially co-located with the first dirty subunit in the first unit of data stored at the first memory address of the near memory so that the additional spatially co-located subunit of data of the first unit of data is read from the near memory and marked as clean in the near memory instead of being evicted from the near memory in accordance with the eviction policy, and writing back the evicted first subunit of data and the scrubbed additional spatially co-located subunit of data of the first unit of data to provide a unit of data which includes the evicted first subunit of data and the scrubbed additional spatially co-located subunit of data to store as a unit of data in the far memory at the first far memory address direct mapped to the first memory entry.

In Example 34, the subject matter of Examples 33-39 (excluding the present Example) can optionally include wherein scrubbing an additional subunit of data includes reading the additional subunit of data from the near memory and resetting a dirty metadata bit associated with the additional subunit of data read from the near memory to indicate that the scrubbed subunit of data is clean.

In Example 35, the subject matter of Examples 33-39 (excluding the present Example) can optionally include wherein scrubbing an additional subunit of data of the unit of data from the near memory includes automatically scrubbing an additional subunit of data of the unit of data from the near memory in response to evicting the first subunit of data from the first memory in accordance with the eviction policy.

In Example 36, the subject matter of Examples 33-39 (excluding the present Example) can optionally include wherein the evicting includes:

storing the first subunit of data in a first entry of a write combining buffer wherein the first write combining buffer entry has a data storage capacity of at least one unit of data, associating a tag representing the first far memory address direct mapped to the first memory entry, with the first write combining buffer entry, evicting from the near memory in accordance with the eviction policy, a second dirty subunit of a unit of data, comparing the far memory address direct mapped to the near memory entry which stored the second evicted subunit of data, to the tag representing the first far memory address direct mapped to the first memory entry, and associated with the first write combining buffer entry, and storing the second evicted subunit of data in the first write combining buffer entry if the far memory address direct mapped to the near memory entry which stored the second evicted subunit of data, matches the tag representing the first far memory address direct mapped to the first memory entry and associated with the first write combining buffer entry such that the second dirty subunit of data is spatially co-located with the evicted first subunit of data, and wherein writing back the evicted first subunit of data and the scrubbed additional spatially co-located subunit of data of the first unit of data includes evicting a unit of data from the first write combining buffer entry and writing the evicted unit of data to a write buffer of a memory controller for the far memory.

In Example 37, the subject matter of Examples 33-39 (excluding the present Example) can optionally include wherein evicting a unit of data from the first write combining buffer entry includes detecting as a function of a state of an invalidity metadata bit that a subunit of data in the first write combining buffer entry is invalid, and in response to detecting that a subunit of data in the first write combining buffer entry is invalid, scrubbing a spatially co-located subunit of data of the unit of data from the near memory to replace the invalid subunit of data and wherein the evicted unit of data written to the write buffer of the memory controller for the far memory includes evicted and scrubbed spatially co-located subunits of data from the near memory.

In Example 38, the subject matter of Examples 33-39 (excluding the present Example) can optionally include wherein the operations further comprise storing the second evicted subunit of data in a second write combining buffer entry if the far memory address direct mapped to the near memory entry which stored the second evicted subunit of data, fails to match the tag representing the first far memory address direct mapped to the first memory entry and associated with the first write combining buffer entry such that the second dirty subunit of data is not spatially co-located with the evicted first subunit of data, and associating a tag representing the far memory address direct mapped to the near memory entry which stored the second evicted subunit of data, with the second write combining buffer entry.

In Example 39, the subject matter of Examples 33-39 (excluding the present Example) can optionally include wherein a unit of data is a sector of data and a subunit of data is a block of data in which a sector of data includes a plurality of blocks of data.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus for use with near and far memories having memory entries at memory addresses, comprising:
  a near memory controller configured to control memory operations for the near memory at a first level of granularity defined by a subunit of units of data, said near memory controller including:
    cache logic configured to control memory operations for the near memory as a direct mapped cache for the far memory in which spatially co-located subunit addresses within a data unit of the far memory are direct mapped to spatially co-located subunit entries of a data unit of the near memory, said cache logic being further configured to evict from the near memory in accordance with an eviction policy, a first dirty subunit of a first unit of data stored in the near memory at a first memory entry to which a corresponding first far memory address is direct mapped to the first memory entry;
    scrubbing logic configured to scrub an additional dirty subunit of data spatially co-located with the first dirty subunit in the first unit of data stored at the first memory address of the near memory so that the additional spatially co-located subunit of data of the first unit of data is read from the near memory and marked as clean in the near memory instead of being evicted from the near memory in accordance with the eviction policy; and
    inter-memory transfer logic configured to write back the evicted first subunit of data and the scrubbed additional spatially co-located subunit of data of the first unit of data to provide a unit of data which includes the evicted first subunit of data and the scrubbed additional spatially co-located subunit of data to store as a unit of data in the far memory at the first far memory address direct mapped to the first memory entry.

2. The apparatus of claim 1 wherein the near memory is configured to store for each subunit of data stored in the near memory an associated dirty metadata bit which when set indicates that the associated subunit of data is dirty, and wherein the scrubbing logic is further configured to reset the dirty metadata bit associated with a scrubbed subunit of data to indicate that the scrubbed subunit of data is clean.

3. The apparatus of claim 1 wherein the scrubbing logic is further configured to automatically scrub an additional spatially co-located dirty subunit of data of the first unit of data in response to the eviction of the first subunit of data of the first unit of data from the near memory in accordance with the eviction policy.

4. The apparatus of claim 2 wherein the near memory is further configured to store for each spatially co-located subunit of data stored in the near memory, a tag representing a corresponding far memory address of the far memory direct mapped to the near memory entry stored in the near memory, and wherein the near memory controller further includes write combining logic having a write combining buffer having a plurality of write combining buffer entries, each write combining buffer entry configured to store a unit of data, and wherein the write combining logic is further configured to store the evicted first subunit of data in a first write combining buffer entry and to associate a tag representing the first far memory address direct mapped to the first memory entry, with the first write combining buffer entry;

and wherein the cache logic is further configured to evict from the near memory in accordance with the eviction policy, a second dirty subunit of a unit of data;

and wherein the write combining logic is further configured to:

compare the far memory address direct mapped to the near memory entry which stored the second evicted subunit of data, to the tag representing the first far memory address direct mapped to the first memory entry, and associated with the first write combining buffer entry;

store the second evicted subunit of data in the first write combining buffer entry if the far memory address direct mapped to the near memory entry which stored the second evicted subunit of data, matches the tag representing the first far memory address direct mapped to the first memory entry and associated with the first write combining buffer entry such that the second dirty subunit of data is spatially co-located with the evicted first subunit of data; and to evict a unit of data from the first write combining buffer entry;

and wherein the inter-memory transfer logic is further configured to write back the unit of data evicted from the first write combining buffer entry to provide a unit of data which includes the evicted first and second spatially co-located subunits of data to store as a unit of data in the far memory at the first far memory address direct mapped to the first memory entry.

5. The apparatus of claim 4 wherein the write combining logic includes metadata memory configured to store for each subunit of data stored in a write combining buffer entry, an associated validity metadata bit which when set indicates that the associated subunit of data stored in a write combining buffer entry is invalid, and wherein the scrubbing logic is further configured to, in association with eviction of a unit of data from the first write combining buffer entry, detect as a function of a state of an invalidity metadata bit that a subunit of data in the first write combining buffer entry is invalid, and in response to detecting that a subunit of data in the first write combining buffer entry is invalid, to scrub a spatially co-located subunit of data of the unit from the near memory to replace the invalid subunit of data and wherein the unit of data provided by the inter-memory transfer logic includes evicted and scrubbed spatially co-located subunits of data from the near memory.

6. The apparatus of claim 4 wherein the write combining logic is further configured to:

store the second evicted subunit of data in a second write combining buffer entry if the far memory address direct mapped to the near memory entry which stored the second evicted subunit of data, fails to match the tag representing the first far memory address direct mapped to the first memory entry and associated with the first write combining buffer entry such that the second dirty subunit of data is not spatially co-located with the evicted first subunit of data; and to associate a tag representing the far memory address direct mapped to the near memory entry which stored the second evicted subunit of data, with the second write combining buffer entry.

7. The apparatus of claim 1 wherein a unit of data is a sector of data and a subunit of data is a block of data in which a sector of data includes a plurality of blocks of data.

8. A method, comprising:

evicting from a near memory in accordance with an eviction policy, a first dirty subunit of a first unit of data stored in the near memory at a first memory entry to which a corresponding first far memory address is direct mapped to the first memory entry;

scrubbing an additional dirty subunit of data spatially co-located with the first dirty subunit in the first unit of data stored at the first memory address of the near memory so that the additional spatially co-located subunit of data of the first unit of data is read from the near memory and marked as clean in the near memory instead of being evicted from the near memory in accordance with the eviction policy; and writing back the evicted first subunit of data and the scrubbed additional spatially co-located subunit of data of the first unit of data to provide a unit of data which includes the evicted first subunit of data and the scrubbed additional spatially co-located subunit of data to store as a unit of data in the far memory at the first far memory address direct mapped to the first memory entry.

9. The method of claim 8 wherein scrubbing an additional subunit of data includes reading the additional subunit of data from the near memory and resetting a dirty metadata bit associated with the additional subunit of data read from the near memory to indicate that the scrubbed subunit of data is clean.

10. The method of claim 8 wherein scrubbing an additional subunit of data of the unit of data from the near memory includes automatically scrubbing an additional subunit of data of the unit of data from the near memory in response to evicting the first subunit of data from the first memory in accordance with the eviction policy.

11. The method of claim 9 wherein the evicting includes:

storing the first subunit of data in a first entry of a write combining buffer wherein the first write combining buffer entry has a data storage capacity of at least one unit of data;

associating a tag representing the first far memory address direct mapped to the first memory entry, with the first write combining buffer entry;

evicting from the near memory in accordance with the eviction policy, a second dirty subunit of a unit of data;
comparing the far memory address direct mapped to the near memory entry which stored the second evicted subunit of data, to the tag representing the first far memory address direct mapped to the first memory entry, and associated with the first write combining buffer entry; and
storing the second evicted subunit of data in the first write combining buffer entry if the far memory address direct mapped to the near memory entry which stored the second evicted subunit of data, matches the tag representing the first far memory address direct mapped to the first memory entry and associated with the first write combining buffer entry such that the second dirty subunit of data is spatially co-located with the evicted first subunit of data; and
wherein writing back the evicted first subunit of data and the scrubbed additional spatially co-located subunit of data of the first unit of data includes evicting a unit of data from the first write combining buffer entry and writing the evicted unit of data to a write buffer of a memory controller for the far memory.

12. The method of claim 11 wherein evicting a unit of data from the first write combining buffer entry includes detecting as a function of a state of an invalidity metadata bit that a subunit of data in the first write combining buffer entry is invalid, and in response to detecting that a subunit of data in the first write combining buffer entry is invalid, scrubbing a spatially co-located subunit of data of the unit of data from the near memory to replace the invalid subunit of data and wherein the evicted unit of data written to the write buffer of the memory controller for the far memory includes evicted and scrubbed spatially co-located subunits of data from the near memory.

13. The method of claim 11 further comprising storing the second evicted subunit of data in a second write combining buffer entry if the far memory address direct mapped to the near memory entry which stored the second evicted subunit of data, fails to match the tag representing the first far memory address direct mapped to the first memory entry and associated with the first write combining buffer entry such that the second dirty subunit of data is not spatially co-located with the evicted first subunit of data; and associating a tag representing the far memory address direct mapped to the near memory entry which stored the second evicted subunit of data, with the second write combining buffer entry.

14. The method of claim 8 wherein a unit of data is a sector of data and a subunit of data is a block of data in which a sector of data includes a plurality of blocks of data.

15. A system comprising:
a central processing unit;
a near memory having near memory entries at near memory addresses;
a far memory having far memory entries at far memory addresses; and
a near memory controller configured to control memory operations for the near memory at a first level of granularity defined by a subunit of units of data, said near memory controller including:
cache logic configured to control memory operations for the near memory as a direct mapped cache for the far memory in which spatially co-located subunit addresses within a data unit of the far memory are direct mapped to spatially co-located subunit entries of a data unit of the near memory, said cache logic being further configured to evict from the near memory in accordance with an eviction policy, a first dirty subunit of a first unit of data stored in the near memory at a first memory entry to which a corresponding first far memory address is direct mapped to the first memory entry;
scrubbing logic configured to scrub an additional dirty subunit of data spatially co-located with the first dirty subunit in the first unit of data stored at the first memory address of the near memory so that the additional spatially co-located subunit of data of the first unit of data is read from the near memory and marked as clean in the near memory instead of being evicted from the near memory in accordance with the eviction policy; and
inter-memory transfer logic configured to write back the evicted first subunit of data and the scrubbed additional spatially co-located subunit of data of the first unit of data to provide a unit of data which includes the evicted first subunit of data and the scrubbed additional spatially co-located subunit of data to store as a unit of data in the far memory at the first far memory address direct mapped to the first memory entry.

16. The system of claim 15 wherein the near memory is configured to store for each subunit of data stored in the near memory an associated dirty metadata bit which when set indicates that the associated subunit of data is dirty, and wherein the scrubbing logic is further configured to reset the dirty metadata bit associated with a scrubbed subunit of data to indicate that the scrubbed subunit of data is clean.

17. The system of claim 15 wherein the scrubbing logic is further configured to automatically scrub an additional spatially co-located dirty subunit of data of the first unit of data in response to the eviction of the first subunit of data of the first unit of data from the near memory in accordance with the eviction policy.

18. The system of claim 16 wherein the near memory is further configured to store for each spatially co-located subunit of data stored in the near memory, a tag representing a corresponding far memory address of the far memory direct mapped to the near memory entry stored in the near memory, and wherein the near memory controller further includes write combining logic having a write combining buffer having a plurality of write combining buffer entries, each write combining buffer entry configured to store a unit of data, and wherein the write combining logic is further configured to store the evicted first subunit of data in a first write combining buffer entry and to associate a tag representing the first far memory address direct mapped to the first memory entry, with the first write combining buffer entry;
and wherein the cache logic is further configured to evict from the near memory in accordance with the eviction policy, a second dirty subunit of a unit of data;
and wherein the write combining logic is further configured to:
compare the far memory address direct mapped to the near memory entry which stored the second evicted subunit of data, to the tag representing the first far memory address direct mapped to the first memory entry, and associated with the first write combining buffer entry;
store the second evicted subunit of data in the first write combining buffer entry if the far memory address direct mapped to the near memory entry which stored the second evicted subunit of data, matches the tag representing the first far memory address direct mapped to the first memory entry and associated with the first write combining buffer entry such that the second dirty subunit of data is spatially co-located with the evicted first subunit of data; and to evict a unit of data from the first write combining buffer entry;

and wherein the inter-memory transfer logic is further configured to write back the unit of data evicted from the first write combining buffer entry to provide a unit of data which includes the evicted first and second spatially co-located subunits of data to store as a unit of data in the far memory at the first far memory address direct mapped to the first memory entry.

19. The system of claim 18 wherein the write combining logic includes metadata memory configured to store for each subunit of data stored in a write combining buffer entry, an associated validity metadata bit which when set indicates that the associated subunit of data stored in a write combining buffer entry is invalid, and wherein the scrubbing logic is further configured to, in association with eviction of a unit of data from the first write combining buffer entry, detect as a function of a state of an invalidity metadata bit that a subunit of data in the first write combining buffer entry is invalid, and in response to detecting that a subunit of data in the first write combining buffer entry is invalid, to scrub a spatially co-located subunit of data of the unit from the near memory to replace the invalid subunit of data and wherein the unit of data provided by the inter-memory transfer logic includes evicted and scrubbed spatially co-located subunits of data from the near memory.

20. The system of claim 18 wherein the write combining logic is further configured to:
store the second evicted subunit of data in a second write combining buffer entry if the far memory address direct mapped to the near memory entry which stored the second evicted subunit of data, fails to match the tag representing the first far memory address direct mapped to the first memory entry and associated with the first write combining buffer entry such that the second dirty subunit of data is not spatially co-located with the evicted first subunit of data; and
to associate a tag representing the far memory address direct mapped to the near memory entry which stored the second evicted subunit of data, with the second write combining buffer entry.

21. The system of claim 15 wherein a unit of data is a sector of data and a subunit of data is a block of data in which a sector of data includes a plurality of blocks of data.

22. The system of claim 15 further comprising at least one of:
a display communicatively coupled to the central processing unit, a network interface communicatively coupled to the central processing unit, and a battery coupled to provide power to the system.

* * * * *